(12) United States Patent
Valluru et al.

(10) Patent No.: US 12,106,534 B2
(45) Date of Patent: Oct. 1, 2024

(54) CINEMATIC IMAGE FRAMING FOR WIDE FIELD OF VIEW (FOV) CAMERAS

(71) Applicant: Apple Inc., Cupertino, CA (US)

(72) Inventors: Sudhakar Valluru, San Jose, CA (US); Ali-Amir Aldan, Sunnyvale, CA (US); Brandon J. Corey, Palo Alto, CA (US); Siva Kiran V. Yellamraju, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 375 days.

(21) Appl. No.: 17/656,603

(22) Filed: Mar. 25, 2022

(65) Prior Publication Data
US 2022/0335703 A1 Oct. 20, 2022

Related U.S. Application Data

(60) Provisional application No. 63/176,579, filed on Apr. 19, 2021.

(51) Int. Cl.
*G06T 5/80* (2024.01)
*G06V 10/25* (2022.01)

(52) U.S. Cl.
CPC ............... *G06V 10/25* (2022.01); *G06T 5/80* (2024.01); *G06T 2207/20104* (2013.01)

(58) Field of Classification Search
CPC ............ G06V 10/25; G06T 5/80; G06T 2207/20104; G06T 2207/10016;
(Continued)

(56) References Cited

U.S. PATENT DOCUMENTS 8,599,238 B2   12/2013   Wu
9,658,688 B2   5/2017   Shen
(Continued)

FOREIGN PATENT DOCUMENTS

CN   103152518 A   6/2013
CN   103534726 A   1/2014
CN   106464803 A   2/2017

OTHER PUBLICATIONS

Shih, et al., "Distortion-Free Wide-Angle Portraits on Camera Phones," ACM Trans. Graph., vol. 38, No. 4, Article 61, Jul. 2019.

*Primary Examiner* — Chuong A Ngo
(74) *Attorney, Agent, or Firm* — Blank Rome LLP

(57) ABSTRACT

Devices, methods, and non-transitory program storage devices are disclosed herein to provide improved region of interest (ROI) tracking, image framing, and distortion correction for wide field of view (FOV) video image streams. The techniques disclosed may be configured, such that the image framing decisions made over the course of a captured wide FOV video image stream are able to be panned smoothly and seamlessly transition between framing a narrower portion of a wide angle camera's FOV to framing a wider portion of the wide angle camera's FOV (or vice versa), e.g., depending on the composition and movement of relevant subjects in the captured scene. The techniques disclosed herein may also be used to perform any distortion correction desired on the framed image portions in the output video image stream, e.g., based on the image portions' FOVs and/or the locations of the portions within the original wide FOV video image stream.

20 Claims, 11 Drawing Sheets

(58) Field of Classification Search
CPC ........... G06T 2207/30196; G06T 11/00; G06T 7/0002; G06T 2207/10004
See application file for complete search history.

(56) References Cited

U.S. PATENT DOCUMENTS

| | | |
|---|---|---|
| 10,097,759 B1 | 10/2018 | Motta |
| 10,154,228 B1 | 12/2018 | Van Tuyl Bentley |
| 10,223,591 B1* | 3/2019 | Goldenberg ......... H04N 23/661 |
| 10,241,207 B2 | 3/2019 | Rosenzweig |
| 11,533,428 B2 | 12/2022 | Sindhagatta Krishnappa |
| 11,647,290 B2 | 5/2023 | Kempf |
| 2016/0219217 A1 | 7/2016 | Williams |
| 2019/0172238 A1 | 6/2019 | Miao |
| 2019/0387171 A1 | 12/2019 | Juang |
| 2020/0327671 A1* | 10/2020 | Arbel ...................... G06T 7/155 |
| 2020/0382725 A1 | 12/2020 | Gao |

* cited by examiner

CINEMATIC IMAGE FRAMING FOR WIDE FIELD OF VIEW (FOV) CAMERAS

TECHNICAL FIELD

This disclosure relates generally to the field of image processing. More particularly, but not by way of limitation, it relates to techniques for image framing and distortion correction for wide field of view (FOV) video image streams.

BACKGROUND

The advent of portable integrated computing devices has caused a wide proliferation of cameras and other video capture-capable devices. These integrated computing devices commonly take the form of smartphones, tablets, or laptop computers, and typically include general purpose computers, cameras, sophisticated user interfaces including touch-sensitive screens, and wireless communications abilities through Wi-Fi, LTE, HSDPA, New Radio (NR), and other cell-based or wireless technologies. The wide proliferation of these integrated devices provides opportunities to use the devices' capabilities to perform tasks that would otherwise require dedicated hardware and software. For example, integrated devices such as smartphones, tablets, and laptops typically have two or more embedded cameras. These cameras generally amount to lens/camera hardware modules that may be controlled through the general purpose computer using firmware and/or software (e.g., "Apps") and a user interface, including touch-screen buttons, fixed buttons, and/or touchless controls, such as voice control.

The integration of cameras into communication devices such as smartphones, tablets, and laptop computers has enabled people to share images and videos in ways never before possible. It is now very popular to acquire and immediately share photos and video with other people, either by sending them via text message, SMS, or email—or by uploading them to an Internet-based service, such as a social networking site or a multimedia sharing site.

Along with the rise in popularity of photo and video sharing via portable integrated computing devices having integrated cameras has come a rise in videoconferencing via portable integrated computing devices. In particular, users often engage in videoconferencing calls, with the video images typically captured by a front-facing camera on the device, i.e., a camera that faces in the same direction as the camera device's display screen. Most prior art cameras are optimized for either wide angle general photography or for narrower-angle self-portraits and videoconferencing streaming use cases. Those cameras that are optimized for wide angles are typically optimized for group and landscape compositions, but are not optimal for individual portraits, due, e.g., to the distortion that occurs when subjects are at short distances from the camera or at the edges of the camera's field of view. Those cameras that are optimized for portraits and video conference streaming (e.g., "front-facing" cameras) are typically not optimal for landscapes and group photos (or group videoconferencing calls) because of their limited field of view. Moreover, the field of view of a given camera also may influence how the user composes the shot (i.e., how far away and at what angle they position themselves with respect to the device's camera) and the quality of the ultimate captured image.

"Field of view" or "FOV," as used herein, refers to the angular extent of a given scene that is imaged by a camera. FOV is typically measured in terms of a number of degrees, and may be expressed as a vertical FOV, horizontal FOV, and/or diagonal FOV. The diagonal FOV of the image sensor is often referred to herein, as it is a more relevant measure of the camera's optics, since it attempts to cover the corners of the image, where "roll off," i.e., vignetting, problems associated with pixels at the corners of the image sensor may become more pronounced. For reference, a typical 35 mm camera with a lens having a focal length of 50 mm will have a horizontal FOV of 39.6°, a vertical FOV of 27.0°, and a diagonal FOV of 46.8°.

For a given camera-to-subject distance, wide angle lenses (e.g., lenses with focal lengths shorter than the sensor diagonal and/or diagonal FOVs of larger than 70°) will distort perspective, such that objects that are closer to the camera appear to be larger than they would with a normal lens, and distant objects appear to be smaller and further away. Also, objects near the edges of a wide angle lens camera's FOV may become stretched and/or curved, resulting in an unnatural appearance, especially for human faces. Because of these distortions, wide angle lenses are not typically used for portraits, one-on-one videoconferencing situations, or other image capture scenarios where the correct appearance and/or dimensions of a human subject's faces is important for the given application.

Likewise, because of their relatively more limited field of view, a normal or standard lens (e.g., lenses with a focal length approximately equal to the sensor diagonal and/or diagonal FOVs smaller than 70°) is not typically used for photography or video recording of landscapes or larger groups of people (who would often be spread across a larger portion of a scene being captured) and/or in stationary camera settings, wherein the people in a scene that is being captured may regularly move around within the scene—which would cause them to repeatedly pass into (and out of) a standard lens stationary camera's more limited FOV.

Thus, it would be desirable to have methods and systems that provide for improved image framing ("framing," as used herein, refers to a process of determining what portion(s) of a wider FOV source image to use in the generation of an output image) for wide FOV video image streams, such that the captured video stream from the wide FOV camera is intelligently and dynamically framed (and distortion corrected, e.g., via non-linear warping, if necessary) to produce an output video image stream with any desired FOV (from a very narrow FOV all the way up to a very wide FOV) from frame to frame of the video stream, e.g., such that the likely regions of interest (ROI) in the captured scene are included in an aesthetically-pleasing or "cinematic" fashion over the duration of the output video image stream.

SUMMARY

Devices, methods, and non-transitory program storage devices (NPSDs) are disclosed herein to provide for improved region of interest (ROI) tracking, image framing, and distortion correction for wide field of view (FOV) video image streams. In particular, the techniques disclosed herein may be configured, such that the image framing decisions made over the course of a captured wide FOV video image stream have a "cinematic" aesthetic, e.g., panning smoothly from relevant location to relevant location within the wide FOV video image stream and seamlessly transitioning between framing a narrower portion of the wide angle camera's FOV (e.g., when a single subject is in the scene) to framing a wider portion of the wide angle camera's FOV (e.g., when multiple subjects are in the scene), depending on the composition and movement of relevant subjects in the captured scene over time.

The techniques disclosed herein may also be used to perform any distortion correction needed on the framed images in the output video image stream, such that any unnatural distortions in the output images are minimized. The types and degrees of distortion correction applied to the framed images in the output video image stream may be based, at least in part, on the FOVs of the framed images, as well as the location within the original wide FOV video image stream that the given output image was framed from (e.g., a central portion of the wide FOV video image stream may require less distortion correction than a more peripheral portion of the wide FOV video image stream).

Thus, according to some embodiments, there is provided a device, comprising: a memory; one or more image capture devices; and one or more processors operatively coupled to the memory, wherein the one or more processors are configured to execute instructions causing the one or more processors to: obtain a first image from an incoming image stream captured by at least one of the one or more image capture devices, wherein the incoming image stream comprises two or more images of a captured scene, each image having a first field of view (FOV); determine a first a region of interest (ROI) in the captured scene within the first image, wherein the first ROI comprises a first location within the first image having a second FOV, wherein the second FOV is smaller than the first FOV, wherein the first ROI comprises content within the captured scene determined for inclusion in a first output image, and wherein the first output image comprises a first portion of the first image; determine a second ROI in the captured scene within the first image, wherein the second ROI comprises a second location within the first image that is determined based, at least in part, on the first location, and wherein the second ROI has a third FOV that is smaller than the first FOV and that contains, at least in part, the first ROI; determine the first portion of the first image based, at least in part, on the second location and third FOV of the second ROI; and generate the first output image based, at least in part, on the determined first portion of the first image. The generated first output image (and any subsequently generated output images from the incoming image stream) may then be stored, displayed, and/or transmitted to another device, as is desired for a given implementation.

In some embodiments, the one or more processors of the device may further: obtain a second image from the incoming image stream, wherein the second image is captured subsequently to the first image; track the first ROI in the captured scene from the first location in the first image to a third location within the second image; determine, based, at least in part, on a distance between the first location and the third location being greater than a predetermined threshold, to update the second location of the second ROI in the first image to a fourth location within the second image; determine a second portion of the second image based, at least in part, on the fourth location of the second ROI within the second image; and generate a second output image based, at least in part, on the determined second portion of the second image. In some cases, tracking the first ROI in the captured scene from the first location in the first image to a third location within the second image may further comprise the one or more processors: determining an updated second FOV for the first ROI in the second image; determining, based on the updated second FOV, to update the third FOV of the second ROI; and determining the second portion of the second image further based, at least in part, on the updated third FOV of the second ROI within the second image.

In other embodiments, generating the first output image further comprises applying a perspective distortion correction to the determined first portion of the first image based, at least in part, on the second location of the second ROI within the first image and the third FOV of the second ROI.

In some cases, the first ROI may further comprise a third location within the first image having a fourth FOV, wherein the fourth FOV is smaller than the first FOV, and wherein the fourth FOV comprises further content within the captured scene determined for inclusion in the first output image. In such cases, the second ROI may include both the second FOV and the fourth FOV.

In other embodiments, determining the second portion of the second image further comprises: shifting the second ROI from the second location towards the fourth location, according to one or more animation curves (e.g., a horizontal displacement curve, a vertical displacement curve, or a zoom curve), wherein at least one of the one or more animation curves is parameterized by at least one of: an acceleration value; a time value; or an animation constraint value. Over the course of a single frame, the second ROI may move all the way to the fourth location, or only a portion of the way to the fourth location, depending on how the animations are tuned.

In some embodiments, the second location of the second ROI may be determined based, at least in part, on framing at least a portion of the first ROI within the second ROI, according to one or more predetermined framing rules, such as framing certain types of objects (e.g., human faces) at certain places within the second ROI (e.g., centered horizontally and positioned at ⅓ or ⅔ of the frame's height, etc.).

In other embodiments, determining a third location for the first portion may be based, at least in part, on framing the second ROI within the first portion, according to one or more predetermined framing rules.

In still other embodiments, shifting the second ROI from the second location towards the fourth location (which may also include changing the FOV of the second ROI in the process) may be done relative to a determined pivot point within the second ROI, e.g., so as to minimize the amount of translation of the second ROI as it shifts form the second location to the fourth location.

In some cases, e.g., when first ROI includes a human subject, a size of the second FOV of first ROI may be determined based, at least in part, on an estimated depth in the captured scene of the human subject.

Various non-transitory program storage device (NPSD) embodiments are also disclosed herein. Such NPSDs are readable by one or more processors. Instructions may be stored on the NPSDs for causing the one or more processors to perform any of the embodiments disclosed herein. Various image processing methods are also disclosed herein, in accordance with the device and NPSD embodiments disclosed herein.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Figure 1:
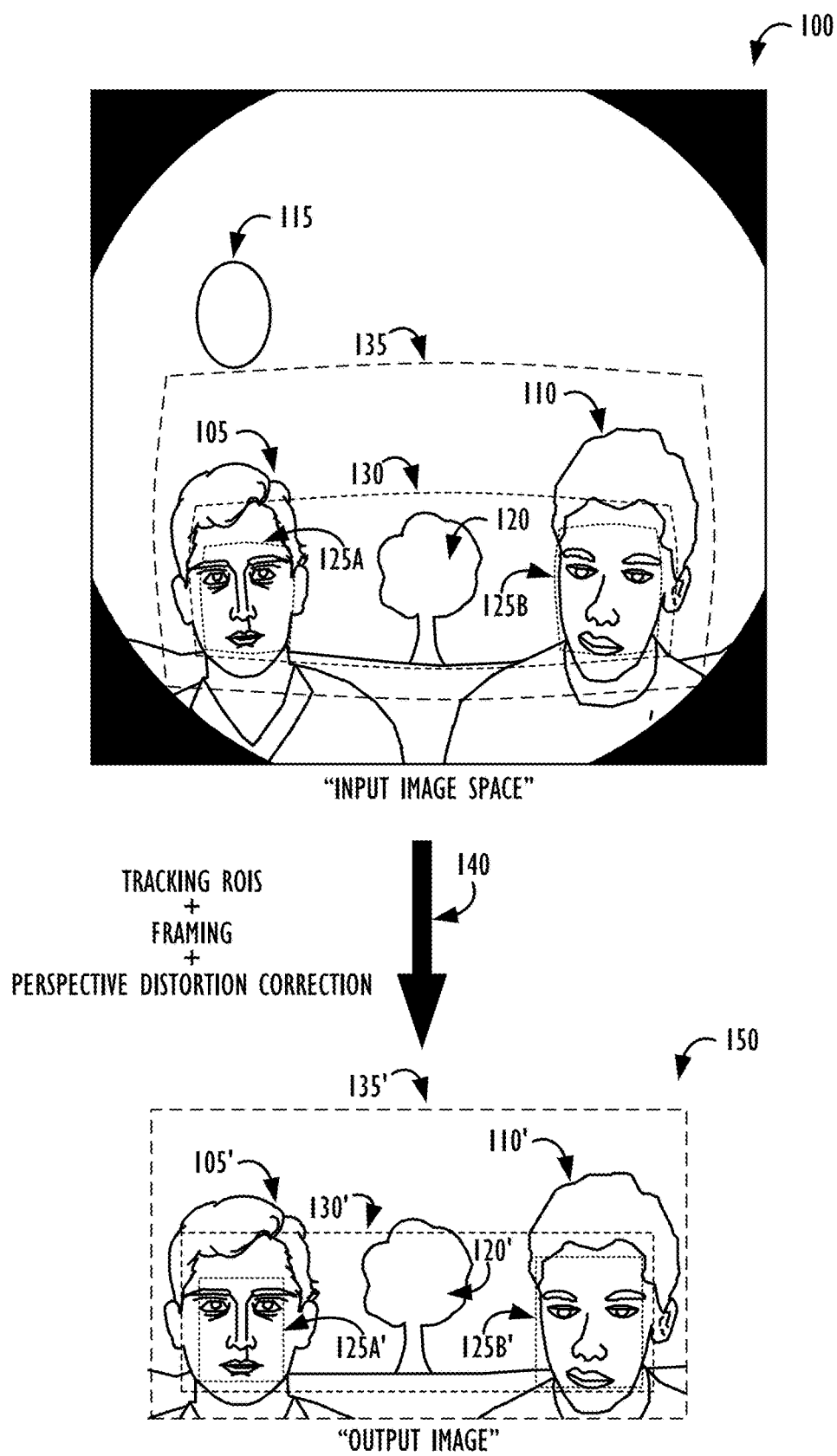
FIG. 1 illustrates an exemplary wide FOV image and a framed and distortion-corrected portion thereof, according to one or more embodiments.

Exemplary Wide FOV Image Region of Interest (ROI) Tracking, Framing, and Distortion-Correction Turning now to FIG. 1, an exemplary wide FOV image 100 and a framed and distortion-corrected portion thereof 150 is shown, according to one or more embodiments. Looking first at exemplary wide FOV image 100, as illustrated by the circular shape of the wide FOV image 100, it may be seen that the captured scene comprises an ultra-wide FOV, e.g., 120° or more. The captured scene comprises various objects, e.g., the sun (115), a first human subject (105), a second human subject (110), and tree (120). As will be illustrated and explained in greater detail below with reference to FIG. 3, the amount of distortion appearing in an object or subject in the captured scene depends on that object or subject's distance from the camera and its position within the wide camera's FOV. For example, objects closer to the periphery of the camera's FOV, such as sun (115) may experience more stretching/warping than an object closer to the center of the wide camera's FOV, such as tree (120).

According to some embodiments, a first one or more regions of interest (ROIs), e.g., human face ROIs 125A and 125B, may be detected and tracked within the captured scene. Although the ROIs 125A and 125B in wide FOV image 100 happen to be roughly the sizes of detected human faces in this example, it is to be understood that any desired type of object or combination of objects could be detected and tracked as an ROI, in a given implementation, e.g., a torso, a head, a particular sub-portion of a subject's face, a region containing a subject's head and shoulders, a coffee mug, etc., and each ROI could have its own distinct location and FOV within the captured scene. As will be described in greater detail below, e.g., with respect to FIG. 5, in some embodiments, a second ROI (130) may be determined to encompass all (or as much as possible) of the first ROI(s) within the image. According to some embodiments, the location and/or dimensions of second ROI 130 within wide FOV image 100 may be determined based on one or more predetermined framing rules. For example, it may be desired to attempt to center the one or more first ROIs at a particular location within the second ROI (e.g., centered horizontally and positioned at approximately ⅓ or ⅔ of the vertical extent of the second ROI, etc.).

Moreover, the dimensions of the second ROI may, e.g., be determined such that there is a particular required (or preferred) border or margin between one or more of: the extents of the first one or more ROIs (125) and the second ROI (130); the extents of the second ROI (130) and a determined first portion (135); and/or the extents of the second ROI (130) and the overall FOV of the wide FOV image (100). For example, in some cases, the location and/or dimensions of the second ROI could be determined as a parameterized function of the location and dimensions of a determined first portion (135), which first portion (135), as will be explained in greater detail below, may be used to generate an output image based on the current input wide FOV image 100.

In some embodiments, it may also be desirable to employ one or more delay timers in making the determination of updating the location and/or dimensions of second ROI 130 within wide FOV image 100. For example, in some implementations, the location and/or dimensions of second ROI 130 may be updated to be re-centered (and/or otherwise aesthetically re-framed, according to the predetermined framing rules of a given implementation) around the first one or more ROIs only after a certain threshold number, n, of seconds of relative "scene stasis" (e.g., as defined by less than a threshold amount of movement of the captured scene's one or more first ROIs over a predetermined sampling time) have passed.

In other words, if one or more first ROIs are still rapidly moving around the captured frame, or moving in and out of the frame quickly, etc., the use of delay timers will prevent the second ROI from changing locations and/or dimensions too rapidly, i.e., caused by very temporary or irregular movement around the scene by any of the one or more first ROIs being tracked, and thereby resulting in a jarring or jittery output video. On the other hand, if a first ROI has appreciably changed its size and/or location within the captured scene for more than the threshold amount of time, it then makes sense to begin to change the location and/or dimensions of the second ROI 130 to begin to contain and/or otherwise frame the one or more first ROIs, according to the predetermined framing rules.

As will be explained in greater detail below, when a determination is made to begin to change the location and/or dimensions of the second ROI 130 (and, by extension, the location and/or dimensions of the first portion 135), such changes may be made according to one or more smooth animation curves and/or via the use of a predetermined "pivot point," thus providing the "cinematic" feel to the changing FOV that is used (and, optionally, distortion corrected) from the input wide FOV video image stream to produce an output video image stream.

As may now be more fully understood, determining an exact aesthetic portion to pull from a camera with non-linear movement and reprojection is difficult. Thus, in some embodiments, an approximate framing may be determined in a space also referred to herein as "framing space." Framing space essentially refers to some subset of the wide FOV camera's FOV. In some embodiments, the framing space may be chosen, such that it is a rectangle in a spherical (or cylindrical) coordinate system that corresponds to a non-linear subset in the original wide FOV image 100. Within that rectangle of framing space, various framing operations may be conducted in a linear fashion, even though, when translated back to the original image, they are not linear. It is to be understood that, by using a linear representation, certain operations may become much less computationally complex than if they had to be performed in the original input image space. As illustrated in FIG. 1, common element numerals correspond to one another, with element numerals without apostrophes corresponding the objects and regions as they appear in "input image space," and element numerals with apostrophes corresponding the objects and regions as they would appear in framing space, which may, e.g., be represented by a spherical coordinate system, such that a resulting linear/rectangular first portion determined in framing space (e.g., first portion 135') may be mapped back to a corresponding non-linear "virtual camera" projection (i.e., first portion 135) in input image space. As used herein, the term "virtual camera" will be used to refer to the sub-portion of the wide FOV camera's captured image that will be used from the input image, e.g., in the generation of a perspective-corrected output image, such as exemplary output image 150, illustrated in FIG. 1. In some embodiments, a virtual camera module could also take in other camera-related signals as input. For example, lens parameters, such as focal length, style of lens, etc., may also further influence how the identified sub-portion of the wide FOV camera's image may be used and/or modified in the generation of an output image. In other words, first regions of interest 125A and 125B in input image space (which correspond roughly to patches that would exist on the outer surface of a sphere) may be mapped to rectangular regions of interest 125A' and 125B' in the perspective-corrected output image 150. Tree 120 in input image space maps to tree 120' in perspective-corrected output image 150, and region 115 in input image space does not appear in perspective-corrected output image 150, due the dimensions and location of determined first portion 135, as will be explained in further detail below.

Once the mapped first ROIs (i.e., represented by 125A' and 125B', in the example of FIG. 1) are determined in framing space, a second ROI (130') may be identified. As mentioned above, in some embodiments, the goal of the second ROI 130' may be to contain and/or otherwise frame the one or more first ROIs, according to the predetermined framing rules. In the example of FIG. 1, second ROI 130' is a rectangular region that includes both first ROIs 125A' and 125B', leaving some borders or margins between the extents of the first ROIs and the second ROI 130'. The second ROI 130' is also positioned, such that the first ROIs 125A' and 125B' are centered at a desired location within second ROI 130', in this case perhaps along a horizontal line extending across the second ROI 130' roughly ⅓ of the way up from its bottom edge. Of course, any framing rules are possible, depending on the desired aesthetics of a given system. By leaving a predetermined or configurable border or margin between the extents of the first ROI and the second ROI, the system may, in effect, dampen or delay the amount of movement or change in the location and dimensions of the ultimately determined first portion 135. For example, in some embodiments, the second ROI 130' may be configured to remain stationary unless or until at least one first ROI 125 being tracked by the system comes within a threshold distance (e.g., 100 pixels) of the present borders of the second ROI. In this way, the second ROI won't relocate until one (or more) of the first ROIs "push" it a substantial amount in one direction or another, at which point, the system may again apply its predetermined framing rules to re-center (or otherwise reframe) the one or more first ROIs within the newly-updated location and/or dimensions of the second ROI.

As mentioned above, the use of one or more delay timers may also be used in making the determination of when to update the location and/or dimensions of the second ROI. That is, in addition to the border threshold distance check, the system may also require that a first ROI be within the threshold distance of a border of the second ROI for a tunable threshold amount of time, e.g., 5 seconds, before updating the location and/or dimensions of the second ROI. In that way, if, say, human subject 110 moved a few feet farther away from human subject 105 for just 1 or 2 seconds, but then returned to his current position in wide FOV image 100, the location and/or dimensions of second ROI 130 would not need to be updated, because the change in position of subject 110 would not have lasted for longer than the threshold amount of time. On the other hand, if subject 110 moved away from subject 105 for greater than the threshold amount of time, the system could begin to smoothly and gradually update the location and/or dimensions (e.g., increasing the size of second ROI 130 to loop in subject 110 again) to accommodate the new farther-away standing position of subject 110, as will be explained in greater detail below.

Although shown in FIG. 1 in the context of an image having two discrete, non-overlapping first ROIs, in practice, the same second ROI movement dampening techniques described above may be applied with only a single ROI (e.g., a single human subject), as well. In other words, a very brief movement of the single human subject to another side of the captured scene (or a rapid change in the distance of the single human subject to the camera) may not result in any immediate changing of the location and/or dimensions of the second ROI. However, if the single human subject were to re-establish themselves at a new position (or a new distance) within the scene for longer than the threshold amount of time, the second ROI (and, by extension the overall portion of the input image used in generation of an output image) could again begin to smoothly and gradually update the location and/or dimensions (e.g., increasing the size of second ROI 130) to accommodate the newly-established position of the single human subject, again according to the desired predetermined framing rules.

For any given image (or regions of an image) represented in a rectangular framing space, once the location and dimensions of a second ROI 130' are determined, a first portion 135' may be determined based on the determined location and dimensions of the second ROI 130', again according to any desired predetermined framing rules. For example, a first portion 135' having position (x, y) and size (w, h) within framing space may correspond to a second ROI 130' that is a rectangle located at position: (x+w/2−w*A/2, y+w*B) and having dimensions: (w*A, h*C) within framing space, wherein A, B, and C are parameters that can be configured to change the relative relationship between the size and dimensions of the first portion 135' and the size and dimensions of the second ROI 130' for any given frame. In some embodiments, the aspect ratio of the first portion may be a function of the first portion's width and/or the desired output image's desired aspect ratio.

Once the desired first portion 135' is determined in framing space, it's location (e.g., in the terms of a center point, top-left corner point, etc.) and dimensions (e.g., in terms of a diagonal field of view, a width/height, etc.) may be mapped back to the input image space, so that a virtual camera direction and field of view may be determined to "point" or "pan" a virtual camera to the region in input image space that has been determined as the first portion 135 to pull from the wide FOV camera for the current frame being processed. Finally, at step 140, any necessary perspective distortion correction may be applied to the first portion 135, resulting in output image 150.

As may now be understood, output image 150 is the result of: tracking one or more relevant first ROIs in the input image; making intelligent framing decisions based on the location(s) and size(s) of the relevant first ROIs being tracked and any predetermined framing rules (as well as the application of any desired motion dampening rules to the updated position of a framing from a previous frame); and the application of perspective distortion corrections to account for distortions that may be introduced by the fact that the output image 150 is being taken from a particular location within a wide FOV camera's capture. As illustrated in FIG. 1, the distortion and "stretching" effect in subjects 105' and 110' faces in output image 150 is greatly reduced from the amount of distortion they had at 105 and 110 in input wide FOV image 100. The reduction in distortion of tree 120' is illustrated as being less pronounced, as tree 120 was closer to the center of the original wide image's FOV, where objects experience less distortion. Moreover, large and irrelevant portions of the FOV of original wide FOV image 100, e.g., the sky and sun 115, have been cropped out from the output image 150, as they were not identified as having any relevant ROIs worth tracking.

Figure 2:
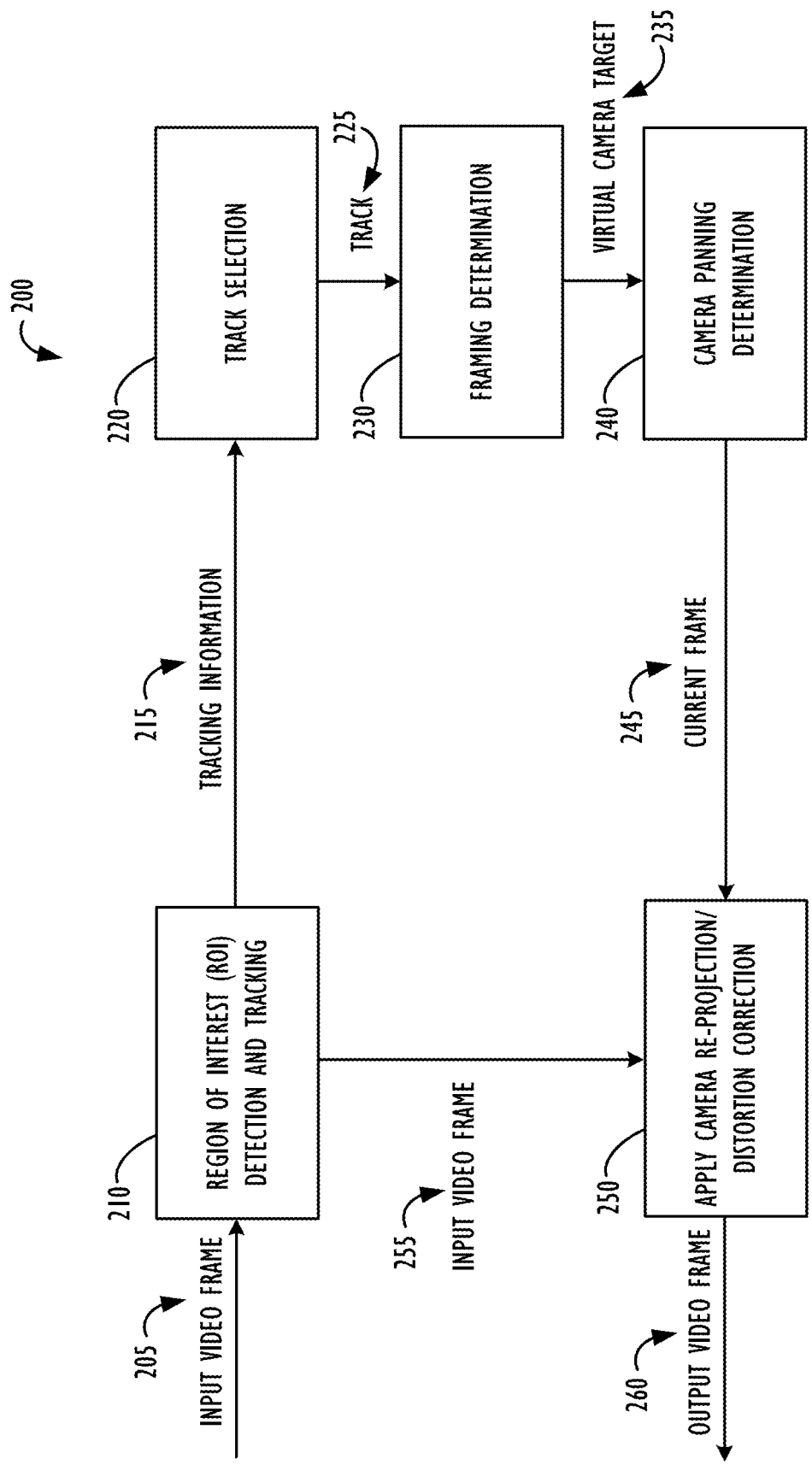
FIG. 2 illustrates an exemplary system diagram for wide FOV image framing, virtual camera panning, and distortion correction, according to one or more embodiments.

System for Wide FOV Image Region of Interest (ROI) Tracking, Framing, Virtual Camera Panning, and Distortion-Correction Turning now to FIG. 2, an exemplary system diagram 200 for wide FOV image framing, virtual camera panning, and distortion correction is shown, according to one or more embodiments. As outlined above with reference to the example illustrated in FIG. 1, the "cinematic" framing systems 200 described herein may begin operations by receiving an input video image frame (205). Within the input image frame, block 210 may perform region of interest (ROI) detection and tracking of one or more regions of interest within the image. As mentioned above, various parameters may be tuned for a given implementation, as to what constitutes an ROI, what types of objects the system is interested in tracking, and any size/quality/duration requirements imposed by the system to justify the continued tracking of a given ROI.

In some implementations, block 210 may be used to perform one or more of the following operations: 1) transforming ROI detection box coordinates from input image space coordinates to framing space coordinates; 2) matching face detection ROIs with corresponding body detection ROIs, e.g., so that an overall 'person' ROI box may be determined (in the event that there are unmatched faces/bodies detected in the scene, they may be matched up with synthetic estimated bodies/faces, such that a reasonable overall body detection box for the subject may be estimated); 3) temporally smoothing the changes in size and/or location of individual ROI detection boxes (e.g., using Kalman filtering); 4) estimating individual ROI detection box velocities (e.g., how fast a given ROI detection box is changing in an x-axial direction, in a y-axial direction, and/or in size, also referred to herein as the z-axial direction); and even 5) estimating whether individual ROI detection boxes are moving or not (e.g., based on their estimated velocities). The tracking information (215) that is ultimately generated by block 210 may then be passed to track selection block 220.

Track selection block 220 may apply various logical rules, including any desired predetermined tracking rules or heuristics, to determine which tracked ROIs should be included in framing decisions to be made by the system. For example, in some embodiments, face-based ROIs with a face size less than a first threshold, threshold1, are simply not tracked. In some such embodiments, face-based ROIs that were previously tracked but now have a face size less a second threshold, threshold2 (wherein threshold2 may be less than threshold1) are dropped from tracking. In this example, having two tracking box size thresholds may assist the system in avoiding undesirable boundary conditions, e.g., wherein a given ROI is constantly included and excluded from consideration in the framing determination process, due to rapid fluctuations or "noise" in the detected face size from frame to frame as the scene composition, scene lux value, and/or overall quality level changes.

In some embodiments, other tracking rules could be applied, e.g., ROI tracks that would require the virtual camera to zoom out beyond a first zoom threshold (i.e., causing the determined framed portion to become too large relative to the overall wide camera FOV) may not be tracked. Similarly, ROIs that were previously tracked but would require virtual camera to zoom out beyond a second zoom threshold even larger than the first zoom threshold may also be dropped from the tracking operation.

In still other embodiments, when there's at least one stationary ROI in the captured scene, then all other ROIs that have been moving for more than a threshold amount of time may be dropped from the tracking operation. For all other moving ROIs (e.g., those that only just began to move, say), the ROIs last stationary position may be used for the subsequent framing decisions. If no ROIs are found that meet the system's tracking criteria, the virtual camera view may smoothly transition back from wherever its current location and dimensions are to the center of the wide FOV camera's FOV, e.g., with a default FOV.

Various other heuristics are also possible to implement in track selection block 220, e.g., ignoring individual subjects or ROIs based on their visual visibility/quality, or ignoring all subjects or ROIs based on an estimated scene lux value, etc.

The tracking information regarding the selected ROI tracks (225) that is ultimately generated by track selection block 220 may then be passed to framing determination block 230.

The role of framing determination block 230 has been introduced above with respect to FIG. 1 and the determination of the exemplary second ROI 130 and first portion 135 of the input image, from which an output image may be generated. In particular, the framing determination block 230 will determine dimensions and locations of an aesthetically-chosen portion of the wide FOV camera in a linear framing space, e.g., according to one or more predetermined framing rules, and then map the determined portion back to input image space and create a perspective distortion-corrected version of the determined portion (with potential modifications to exclude any "invalid pixels," i.e., pixel location mapped back to input image space for where the camera does not have any captured image data, e.g., the "black" corner regions of wide FOV image 100 in FIG. 1). The so-called "virtual camera target" information, i.e., the information specifying the location and/or dimensions of the target determined portion from the wide FOV camera (235) that is ultimately generated by framing determination block 230 may then be passed to camera panning determination block 240.

Camera panning determination block 240 may serve a role of smoothly and intelligently shifting the view of the virtual camera for the previous input video frame towards the virtual camera target determined for the current input video frame. In particular, the camera panning determination block 240 may determine how to shift the second ROI from its current position towards the virtual camera target determined for the current input video frame according to one or more animation curves. The one or more animation curves may comprise a horizontal displacement curve; a vertical displacement curve; and/or a zoom curve. For each axial direction of virtual camera panning movement governed by an animation curve (e.g., horizontal, vertical, and/or zoom), the respective animation curve may be parameterized by at least one of: an acceleration value; a time value; or an animation constraint value. This would allow the system to, e.g., on every new frame, independently apply an amount of acceleration to a particular axial direction animation curve to make sure that camera pans towards its framing goal at a desired rate and smoothness.

For example, if $a_x$ represents an amount of acceleration to apply to the movement of the current virtual camera position towards the framing goal in the x-axial (e.g., horizontal) direction, and $\Delta t$ represents the amount of time passed since the last image frame, and $v_x$ represents the velocity of the virtual camera in the x-axial direction for the current image frame, then the velocity of the virtual camera in the x-axial direction after the time, $\Delta t$, may be represented as: $v_x'=v_x+a_x\Delta t$, while the position of the virtual camera in the x-axial direction after the time, $\Delta t$, may be represented as: $x'=x+v_x'\Delta t$. Similar determinations may be made in the other axial directions (e.g., the y-axial direction and the z-/zoom axial direction) for each frame. As may now be understood, depending on the animation curves used, and the distance between the virtual camera's present location and its target location, the virtual camera may or may not arrive all the way at its target location within the duration of one captured input video image frame. Instead, it may take the virtual camera a number of frames to reach its target location, moving only a portion of the way to its target location with each successive frame. Of course, the target location itself could continually be updated with each captured frame, based on the composition of the scene, so the virtual camera will constantly be looking to update its target location and moving towards its target according to its specified animation curves—even if it never actually reaches its target location goal.

If the determined target location for a given frame remains the same (or within a threshold delta) of the virtual camera's current location, then no movement or panning of the camera is necessary for the given frame. As mentioned above, in certain embodiments, the use of delay timers may also be helpful to avoid unwanted or over-movement. In other words, a delay timer of, say, 5 seconds may be set before an updated virtual camera target location actually results in the panning or movement of the virtual camera location. This would allow for brief and/or temporary changes in scene composition to not be interrupted with hurried or jerky apparent camera movement to attempt to accommodate the temporary change in scene composition. However, if the camera target location stayed beyond a threshold delta away from its current location for longer than the setting of the delay timer, the camera panning determination block 240 could begin to institute the movement of the virtual camera position according to one or more animation curves, as described above, by updating the location and/or dimensions of the framed portion being pulled from the current input video image frame.

If desired, particular animation constraints may independently be applied to each axial direction of movement. For example, a panning constraint may comprise an interval of allowed values (e.g., defining minimum and/or maximum permissible velocity and/or acceleration values in one or more axial directions). As another example, acceleration and/or velocity constraint curves may be applied to the movement in one or more axial directions. For example, effects comparable to traditional ease-in, ease-out, or ease-in-out Bezier animation curves may be employed, as desired, to further smooth the "cinematic" movement of the virtual camera. For example, an ease-in curve may limit the acceleration or velocity of the virtual camera at the beginning of a movement to a target location, but ease that constraint as the virtual camera approaches its target location (i.e., when velocity is low, acceleration towards target is low); an ease-out curve may limit the acceleration or velocity of the virtual camera at the end of its movement to a target location (i.e., when displacement to target is small, velocity towards target is low); and an ease-in-out style curve may limit the acceleration or velocity of the virtual camera at both the beginning and ends of its movement towards a target location.

Other types of animation constraints are also possible. For example, constraints on velocity as a function of the virtual camera's current distance to the edges of framing space may be employed to ensure that virtual camera slows down as it approaches the boundaries of the field of view of wide FOV input camera. Likewise, constant constraints on acceleration and/or velocity may be used to ensure that the panning is not too jerky or too fast.

As may now be understood, these various animation constraints allow for customized tuning of the motion in each of virtual camera's axial directions independently. For example, in some cases, it may be desired that zooming in should be done relatively slowly (i.e., the max permitted velocity in the negative z-axial direction should be small in absolute value) compared to zooming out. In other cases, as will be explained in further detail with reference to FIG. 7, it may also be desirable that zooming (i.e., movement in the z-axial direction) should be done relatively faster than panning (i.e., movement in the x- or y-axial directions), e.g., to avoid unintentionally cropping out all or a portion of a new subject or other ROI that has entered the scene on the opposite side of the FOV from a current ROI, and that the virtual camera needs to grow in size (and/or move across the FOV) to accommodate.

The framing information for the current input video image frame, i.e., the information specifying the location and/or dimensions of the determined portion from the wide FOV camera (245) that is ultimately generated by camera panning determination block 240 may then be passed to camera re-projection/distortion correction block 250.

At camera re-projection/distortion correction block 250, one or more forms of appropriate camera projection and/or distortion correction may be applied the current input video frame (255) using the determined location and/or dimensions (e.g., in terms of a horizontal FOV, a vertical FOV, and/or a diagonal FOV) of the portion requested for the current input video image frame (245). In some embodiments, other parameters could also be given to the re-projection/distortion correction block 250, such as desired focal length (or other lens parameter) for the virtual camera to simulate in the current output video frame (e.g., depending on whether there are people present and, if so, how far away from the camera they are estimated to be). In other embodiments, one or more content-specific distortion correction models could also be employed and combined, e.g., based on the content within the determined portion of the wife FOV image (e.g., a distortion correction model tuned specifically for architecture, or a distortion correction model tuned to reduce distortion in certain types of animal faces, etc.) As illustrated in more detail, e.g., in FIG. 4, according to some embodiments, the position of the virtual camera may be rotated (and, if requested, zoomed) to the location and/or dimensions of the determined portion in input image space, and then re-projected into linear framing space to form a planar output video image frame (260) that may then be displayed, stored, and/or transmitted to another device (e.g., in the case of a videoconferencing application), as is desired.

Examples of Perspective Distortion in Wide FOV Cameras

Figure 3:
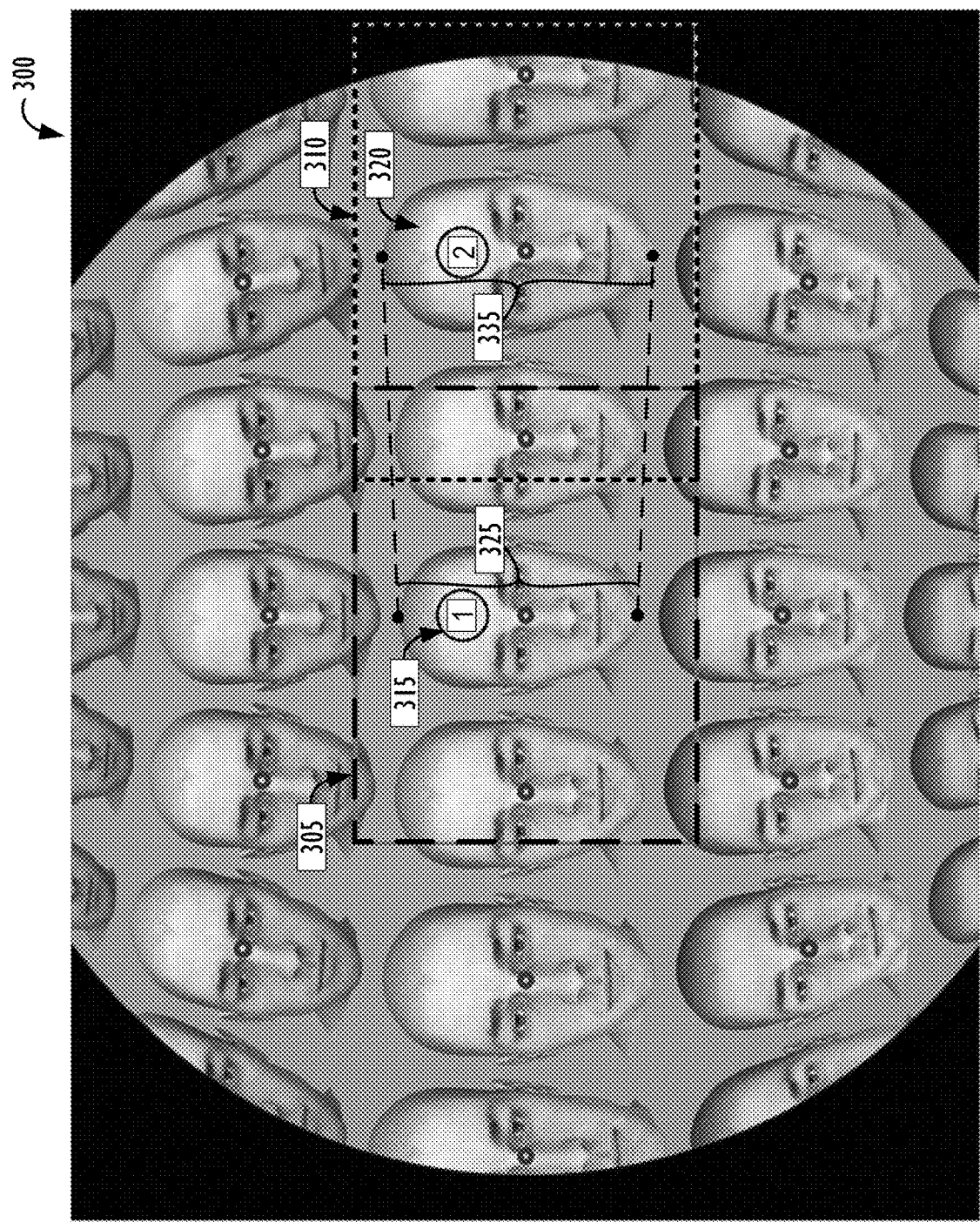
FIG. 3 illustrates an example of distortions at various places across a wide FOV camera lens, according to one or more embodiments.

Turning now to FIG. 3, an example 300 of distortions at various places across a wide FOV camera lens is shown, according to one or more embodiments. In example 300, the same human face is replicated at various places across the camera's FOV to demonstrate the relative distortions that will be experienced at different places within the camera's FOV. For example, the human face 1 (315) is centered in exemplary box 305 (which is closer to the center of the camera's FOV), and the human face 2 (320) is centered in exemplary box 310 (which is closer to the periphery of the camera's FOV). An exemplary corresponding head-to-chin measurement has been marked in both human face 1 (315) and human face 2 (320). As illustrated, head-to-chin measurement 335 for human face 2 (320) is significantly larger than head-to-chin measurement 325 for human face 2 (315). This is consistent with the expectation that, in a wide FOV camera, objects closer to the periphery of the FOV will begin to become stretched and/or warped. Thus, as may be understood, additional perspective distortion correction may be needed for images in an output video image stream that are taken from regions closer to the periphery of the wide camera FOV and/or larger images, generally, that are taken from the wide camera FOV. Also illustrated in FIG. 3 is the principle that image portions taken from closer to the periphery of the wide camera's FOV, e.g., exemplary box 310, may include one or more "invalid" pixels (i.e., the black pixels on the right side of exemplary box 310). In some embodiments, if a determined portion includes one or more invalid pixels, one or more adjustments may be applied to the determined portion (e.g., reducing a size of the determined portion and/or shifting the determined portion back towards the center of the wide FOV camera's FOV) to exclude any invalid pixels from a generated output video image stream.

Perspective Re-Projection Example

Figure 4:
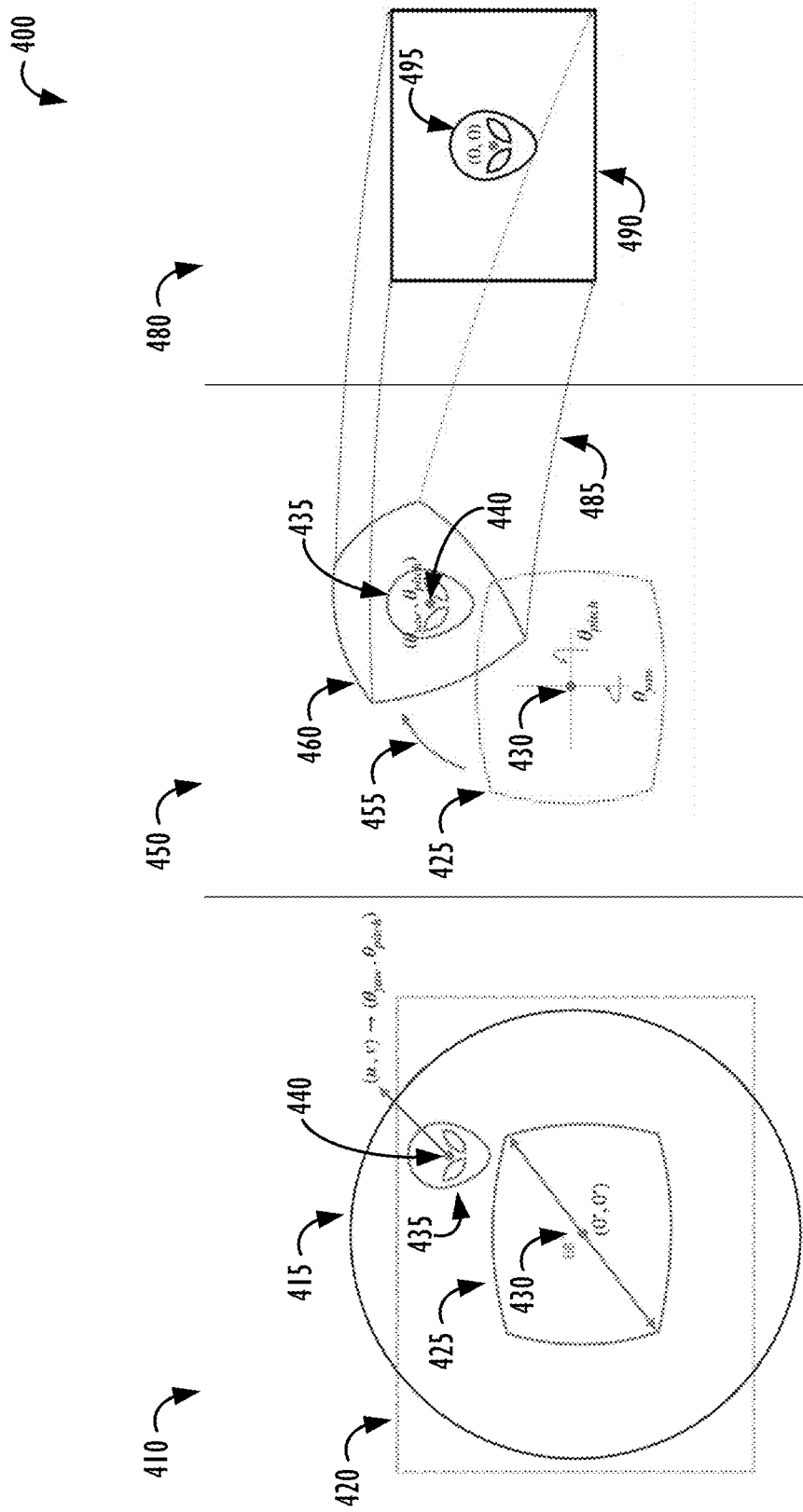
FIG. 4 illustrates an example of spherical image rotation and re-projection to a linear coordinate space, according to one or more embodiments.

Turning now to FIG. 4, an example 400 of spherical image rotation and reprojection to a linear coordinate space is shown, according to one or more embodiments. Image 410 illustrates an example of a cross-sectional plane (420) view of a spherical input image space (415). The spherical input image space 415 in this example may, e.g., represent the FOV of a wide FOV camera, e.g., a camera having an FOV of 120° or more. In this example, a central point 430 has been defined, having spherical coordinates of (0°,0°), that is, a yaw rotation of 0° and a pitch rotation of 0°, and a "default" diagonal field of view of 68° (425). Central point 430 may also be thought of as the optical center of the input camera. In the example of image 410, there is a region of interest (e.g., face 435) that the system wishes to "point" the virtual camera at, e.g., for the purpose of creating a planar, perspective-corrected output image from the wide input image's FOV, for use in a videoconferencing application or the like. ROI 435 is centered at a location that may be represented by a central point 440, having spherical coordinates of ($\theta_{yaw}$, $\theta_{pitch}$), that is, a yaw rotation of $\theta_{yaw}$ degrees and a pitch rotation of $\theta_{pitch}$ degrees from the central point 430. In a spherical (or cylindrical) "framing" image coordinate system, those rotations may correspond to a coordinate value of (u, v). As will be explained below, in some embodiments, a goal of the cinematic framing system may be to "rotate" the central point 440 from its current coordinates of ($\theta_{yaw}$, $\theta_{pitch}$) to be at the camera center point 430 coordinates of (0, 0). To do so, the system may apply an inverse rotation of $-\theta_{yaw}$ radians around the vertical axis of the coordinate system, after which, the central point 440 should have coordinates (0, $\theta_{pitch}$). The system may then apply an inverse rotation around the horizontal axis of the coordinate system of $-\theta_{pitch}$ radians (Note: the signs of rotation angles might differ, depending on how the yaw and pitch values are defined in a given coordinate space). As a result of this second rotation, the central point 440 will be located at (0, 0). In some coordinate systems, the order that the rotations are applied in may matter. This can be summarized with a rotation matrix R, defined as $R_{yaw}*R_{pitch}$. By selecting both framing space and the desired rotations to be in the same spherical coordinate system, the necessary rotations may be applied in framing space by using the (u, v) coordinates. In a more general case, e.g., where framing space may be in a different coordinate system, such as rectangular coordinates, the location of the central point 440 of the ROI 435 may first need to be converted into a corresponding spherical coordinate system before it may be rotated.

Image 450 illustrates an example of rotating (arrow 455) a central (or default) FOV (425) to the determined portion's location (460) and FOV that is centered on ROI 435's central point 440. The location (and/or FOV) of portion 460 for ROI 435 may be determined by an intelligent framing algorithm, such as those described above. It is to be understood that the FOV of portion 460 may also be larger or smaller than the default or central FOV 425, depending on the output of the framing algorithm. Once the desired portion of the input image FOV (460) is determined, it may be rotated back to the center of the camera's FOV and re-projected (arrow 485) into a planar output image coordinate system (also referred to herein as "output image space"), as shown in image 480, to generate a planar and perspective-corrected output image 490, including the newly-centered (and distortion-corrected) ROI 495. In some embodiments, this task of centering and re-projecting a ROI into a planar output image coordinate system may be performed in a single mathematical operation. For example, assuming the camera's re-projection/distortion correction module receives three parameters (i.e., $\theta_{yaw}$, $\theta_{pitch}$, and a desired FOV) as input, then, for every point in the input image, it may compute the corresponding spherical coordinates, e.g., (x, y). (Note that appropriate input camera calibration data may be needed for this operation.) The re-projection/distortion correction module may then change the points according to the following operation: $(\theta^{-1}_{yaw}, \theta^{-1}_{pitch}) \cdot (x, y)$. Finally, all points may be projected back into the planar output image 490. (Note that appropriate virtual camera calibration data may be needed for this operation.)

Framing Determination

Figure 5:
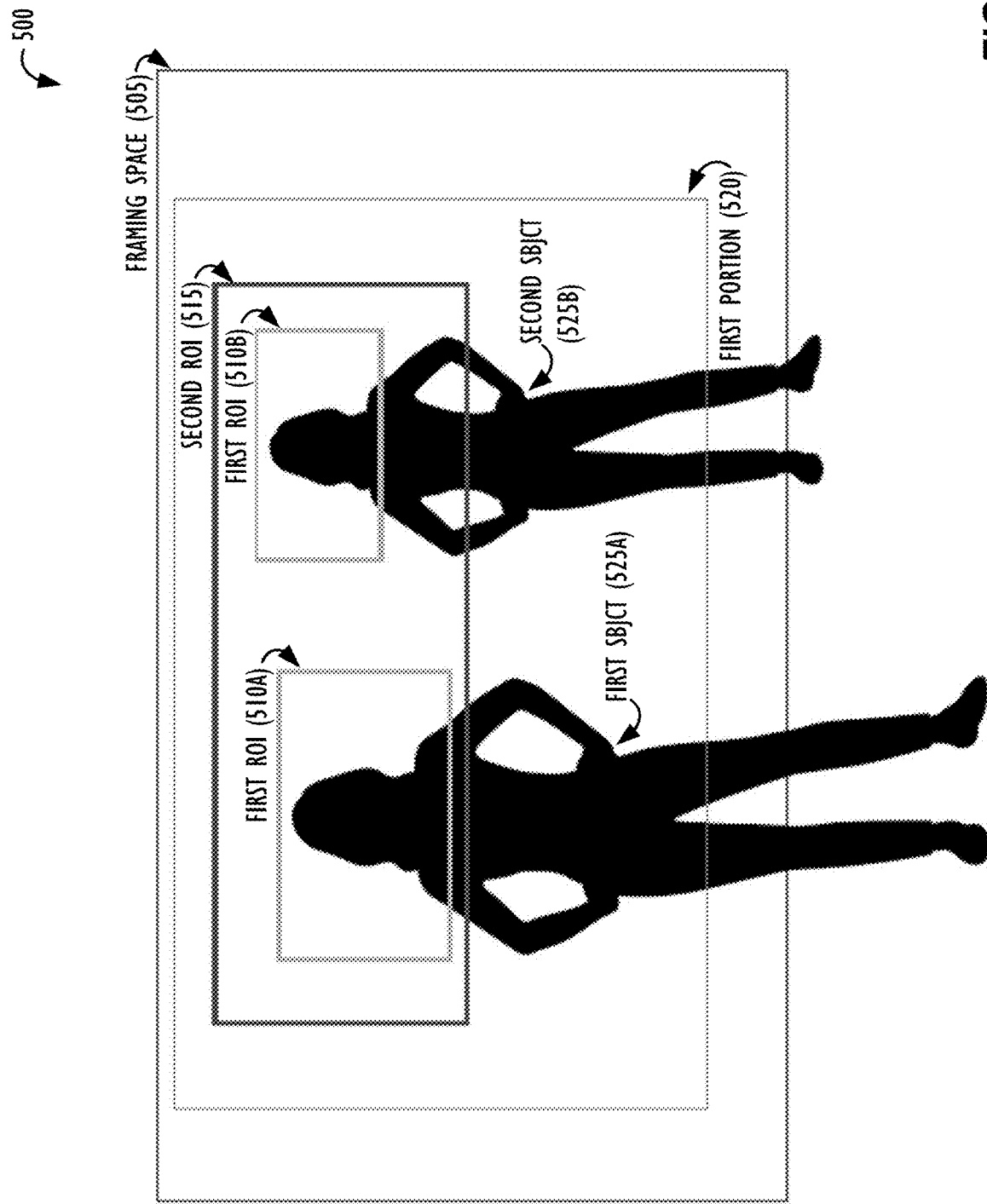
FIG. 5 illustrates an example of determining an image portion in a framing space based on regions of interest, according to one or more embodiments.

Turning now to FIG. 5, an example 500 of determining an image portion in a framing space 505 based on regions of interest (510/515) is shown, according to one or more embodiments. As described above, according to some embodiments, a goal of an intelligent framing determination model may be to determine an aesthetically pleasing or "cinematic" portion of a wide FOV input image in a linear framing space. In some cases, it may be desirable to begin with a default (e.g., central) portion and then modify the default portion (e.g., in terms of location and/or dimensions) as little as possible from frame to frame to maintain desired aesthetic rules.

Any number of desired rules may be put in place for the system to identify, detect and track ROIs in a captured scene. For example, scenes such as scene 500 may have multiple human subjects (e.g., first subject 525A and second subject 525B) within it. Assuming that human heads and shoulders have been determined as first ROIs in a given implementation, the system may initially detect two different first ROIs, i.e., a first ROI 510A corresponding to the head and shoulders of first subject 525A and a first ROI 510B corresponding to the head and shoulders of second subject 525B, that it would be desirable to include in any aesthetically-framed output video image.

As mentioned above, in some embodiments, a second ROI (515) may also be defined by the system, where in the location and dimensions of the second ROI 515 are determined by the system to both: 1) fully contain any first ROIs (e.g., first ROIs 510A and 510B) identified in the captured scene, if possible; and 2) nicely frame any first ROIs contained within the determined second ROI, e.g., according to any predetermined framing rules. As also described above, by allowing for certain borders or margins between the extents of the first ROIs and the extents of the second ROI, as well as the use of one or more delay timers, the movement of the second ROI (i.e., as caused by movement and size changes of the one or more first ROIs) may be dampened, e.g., disregarded until one or more of the first ROIs have moved within a threshold distance from a border of the second ROI (and, optionally, remained at such a position for more than a threshold amount of time). In other embodiments, the use of a movement-dampening second ROI may be disabled, with the first portion being determined, e.g., solely as a bounding box that includes any first ROIs in the scene (along with any desired margins).

Based on the location and dimensions of the second ROI (515), and according to one or more predetermined framing rules and/or tunable parameters, the location and dimensions of a first portion 520 may be determined. As described above, in some embodiments, the dimensions and locations of the second ROI (515) and the first portion (520) may be related by one or more tunable parameterized equations. For example, the first portion may be configured, such that second ROI makes up 75% of the horizontal extent of the first portion and 50% of the vertical extent of the first portion, while being centered horizontally within the first portion and located at the top ⅓ of the vertical extent of the first portion. Placement of the first portion with respect to the second ROI may also be based on other factors, such as zoom level, scene composition, scene quality, device orientation, and the like.

It is to be understood that, in some cases, subjects will be too large, too small, or located too close the edge of the wide FOV camera's FOV for the predetermined framing rules and/or parameters to be met for a given determined first portion. In such cases, the parts of a first ROI that cannot be contained in a second ROI could simply be ignored. Alternately, the system could allow for first portion that technically fall "outside" of the framing space to be included in the output video image stream (e.g., filling the "invalid" pixels in the output image FOV with blurred pixels, black pixels, transparent pixels, repeated edge pixels, etc.

Figure 6:
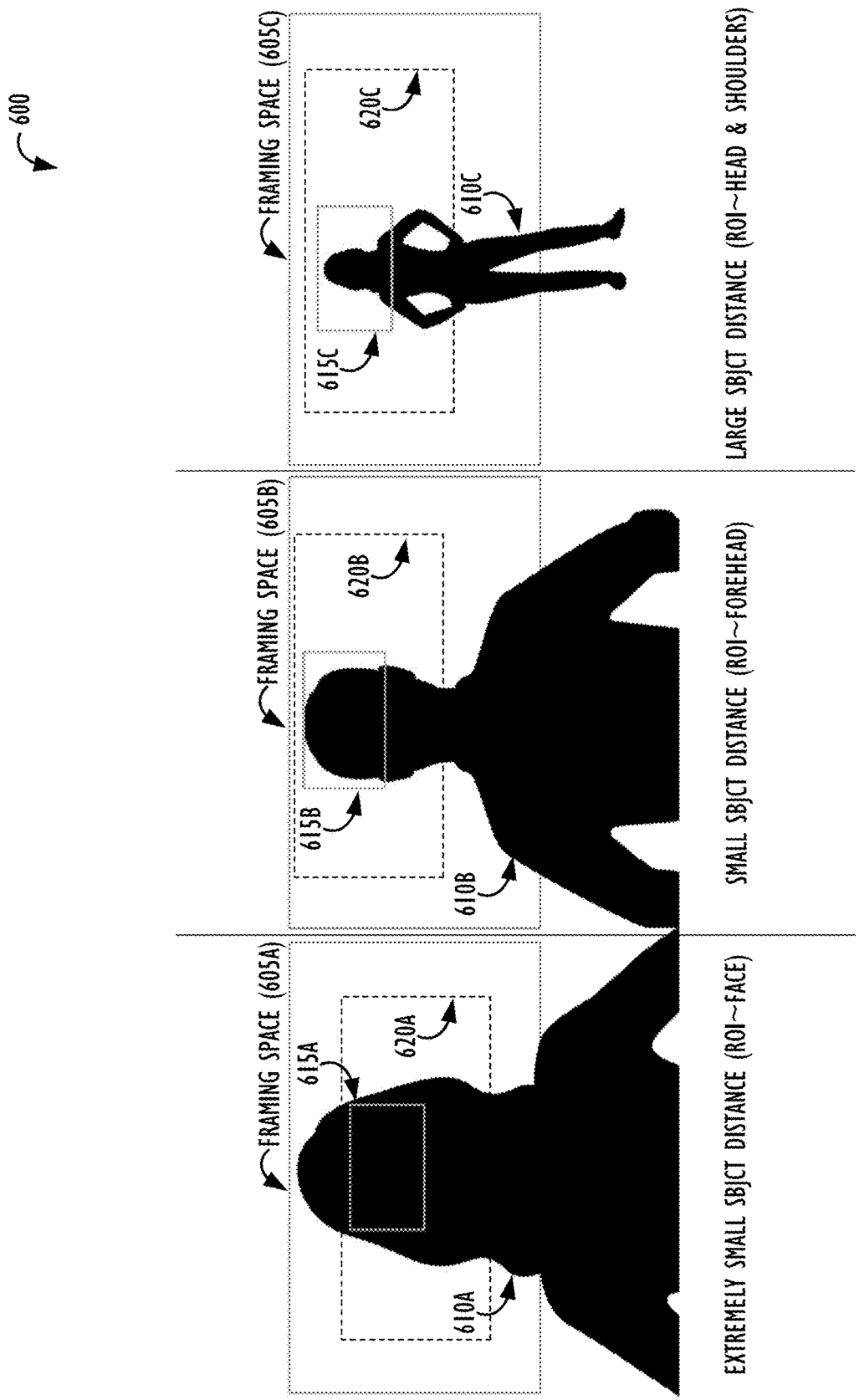
FIG. 6 illustrates additional examples of determining an image portion in a framing space based on regions of interest, according to one or more embodiments.

Turning now to FIG. 6, additional examples 600 of determining an image portion in a framing space based on regions of interest are shown, according to one or more embodiments. As illustrated in FIG. 6, it is to be understood that the portions of a subject that are relevant to the framing determination may vary from implementation to implementation, as well as based on an estimated depth in the captured scene of the subject. For example, for subjects at extremely small distances from the camera (as shown by subject 610A in framing space 605A), the face of the subject will be prominent in the image frame, and thus could have a larger weight or influence on the ultimate determination of the location and/or dimensions of the first ROI 615A/second ROI 620A than other elements of the scene. For subjects at relatively small distances from the camera (as shown by subject 610B in framing space 605B), the forehead of the subject may be the most important feature to frame properly in the image frame, and thus could have a larger weight or influence on the ultimate determination of the location and/or dimensions of the first ROI 615B/second ROI 620B than other elements of the scene. For subjects at larger distances from the camera (as shown by subject 610C in framing space 605C), the whole head of the subject may be the most important feature to frame properly in the image frame, and thus could have a larger weight or influence on the ultimate determination of the location and/or dimensions of the first ROI 615C/second ROI 620C than other elements of the scene. It is to be understood that these combinations are merely exemplary, and they could be tuned depending on the parameterization of the second ROIs and first portions, and other user experience choices or framing preferences.

Virtual Camera Panning Determinations

Figure 7:
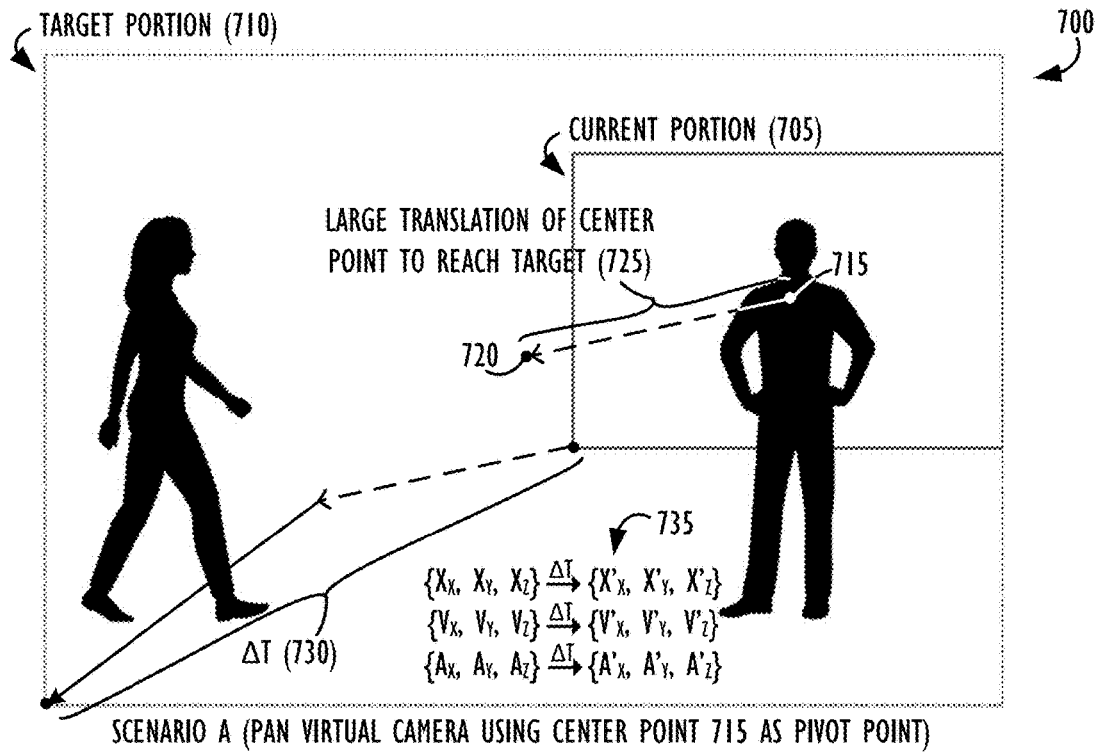
FIG. 7 illustrates examples of determining an image panning movement with and without the use of a determined pivot point, according to one or more embodiments.
Figure 7:
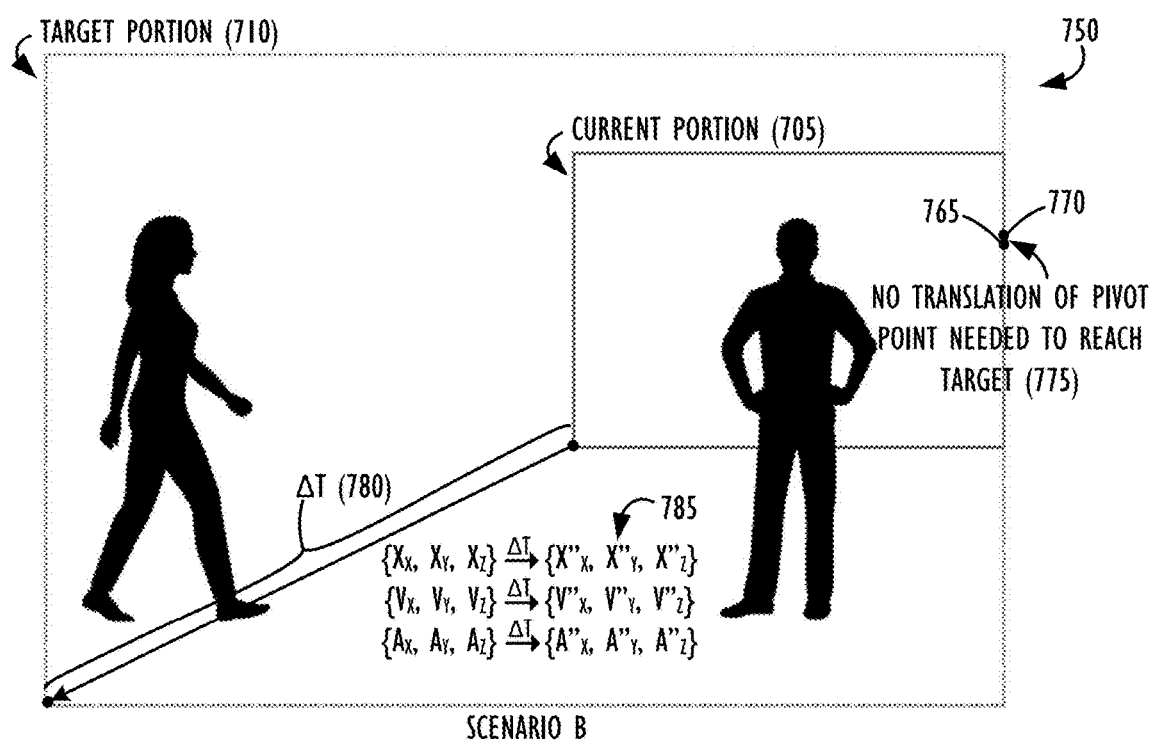

Turning now to FIG. 7, example scenarios 700/750 of determining an image panning movement with and without the use of a determined pivot point are shown, according to one or more embodiments. Looking first at exemplary scenario A 700, the current portion box 705 represents the current portion of the wide camera FOV that is being used to generate an output image. As illustrated, current portion box 705 nicely frames the head and shoulders of the male subject on the right edge of the scene at about ⅓ of the vertical extent of the current portion box 705. In example scenario 700, a female subject has entered the scene on the left edge, causing the intelligent framing algorithm to determine a new target portion box 710, which will include both the female and the male subject in the determined portion of the scene. As described above, the camera panning determination module will begin to both expand and shift the current portion box 705 towards the target portion box 710 over a determined interval of time, Δt, e.g., according to one or more animation curves 735, which may be used to specify the updated position, velocity, and/or acceleration of the current portion box 705 in any of the x-, y-, or z-axial directions towards its target portion location and dimensions, shown as target portion box 710.

However, in some cases, e.g., due to the composition of the scene, the location and/or dimensions of the target portion box and the relative velocities of the current portion box in each of the x-, y-, or z-axial directions, etc., it is possible that all or a sub-portion of one of the first ROIs may be cut out of the current portion in an unaesthetic manner as the current portion moves towards its target portion goal. For example, in exemplary scenario A 700, the virtual camera will be panned using an initial center point 715 of the current portion box 705 as a "pivot point" for the panning operation. That is, all the points within the current portion box 705 will move and expand towards the location and dimensions of the target portion box 710, relative to the center point 715. As illustrated in exemplary scenario A 700, this means that center point 715 of current portion box will translate to point 720, i.e., the central point of target portion box 710. However, if this movement of the center point 715 to point 720 along the dashed line arrow happens more rapidly than the current portion box 705 can expand to the dimensions of the target portion box 710, there may be one or more multiple frames where, e.g., the head of the female subject is cropped out of the frame, i.e., until the dimensions of the current portion box can zoom out/enlarge sufficiently to encompass the entire female subject. Path 730 illustrates that each of the points in the current portion box 705, e.g., including the lower-left corner point illustrated in FIG. 7, also translates and expands according to the animation curves 735, so that the lower-left corner point of current portion ends up as the lower-left corner point of the target portion. As illustrated, some amount of the movement of the lower-left corner point will be due to the translation of the current portion as a whole, and some amount of the movement of the lower-left corner point will be due to the expansion of the current portion box. As with the lower-left corner, the upper-left corner point of current portion ends up as the upper-left corner point of the target portion, and so forth, for all points in the current portion, relative to their corresponding points in the target portion.

Looking now at exemplary scenario B 750, rather than scaling and moving the current portion towards its target portion goal around its center point, the system may instead determine a so-called "pivot point" to scale and move around. As mentioned above, the scaling and moving of the current portion rectangle can be expressed relative to any point within the rectangle, e.g., the center, the lower left corner, a point ⅓ of the way down from the top and ⅓ of the way from the left edge, etc. Thus, according to exemplary scenario B 750, a pivot point may be determined, e.g., via an optimization operation, such that it is a point within both the current portion and the target portion whose relative locations are as close as possible to one another, and, ideally, at the same positions. Using such a determined point as the pivot point for the panning movement from the current portion to the target portion will serve to minimize the pivot translation, and avoid aesthetically unpleasing framing decisions as the current portion moves towards its target portion, such as the example scenario described above, wherein the head of the female subject was temporarily cropped out of frame while the current portion box was translating relative to its central point.

As shown in exemplary scenario B 750, there exists a pivot point 765 in the current portion that is nearly co-located with its corresponding point 770 in the target portion box 710. In other words, each of points 765 and 770 are along the right edge and at approximately ¼ of the way down from the top of the vertical extent of the respective portion boxes. Thus, as shown at 775, there is essentially no translation (or very minimal translation) of the pivot point needed to reach its corresponding location in target portion box 710. As such, the points in current portion may simply expand to their corresponding locations in target portion box 710 during the time interval, Δt, e.g., according to the animation curves 785. In some embodiments, the pivot point may be re-determined with each frame (e.g., in the event that the location and/or dimensions of the target portion have subsequently been updated), so as to minimize pivot point translation, and then the x-, y-, and z-axial direction velocities for the current portion box may be computed for an exemplary point, e.g., the upper-left corner point. At that time, the pivot point may be translated (if necessary), and the upper left point of the current portion and its dimensions may be updated towards the target portion goal. As may now be understood, by minimizing the pivot translation, the current portion is less likely result in a visually unpleasing result when transitioning to the location and dimensions of target portion box 710, e.g., caused by attempting to translate at the same time it is expanding (or contracting).

Figure 8A:
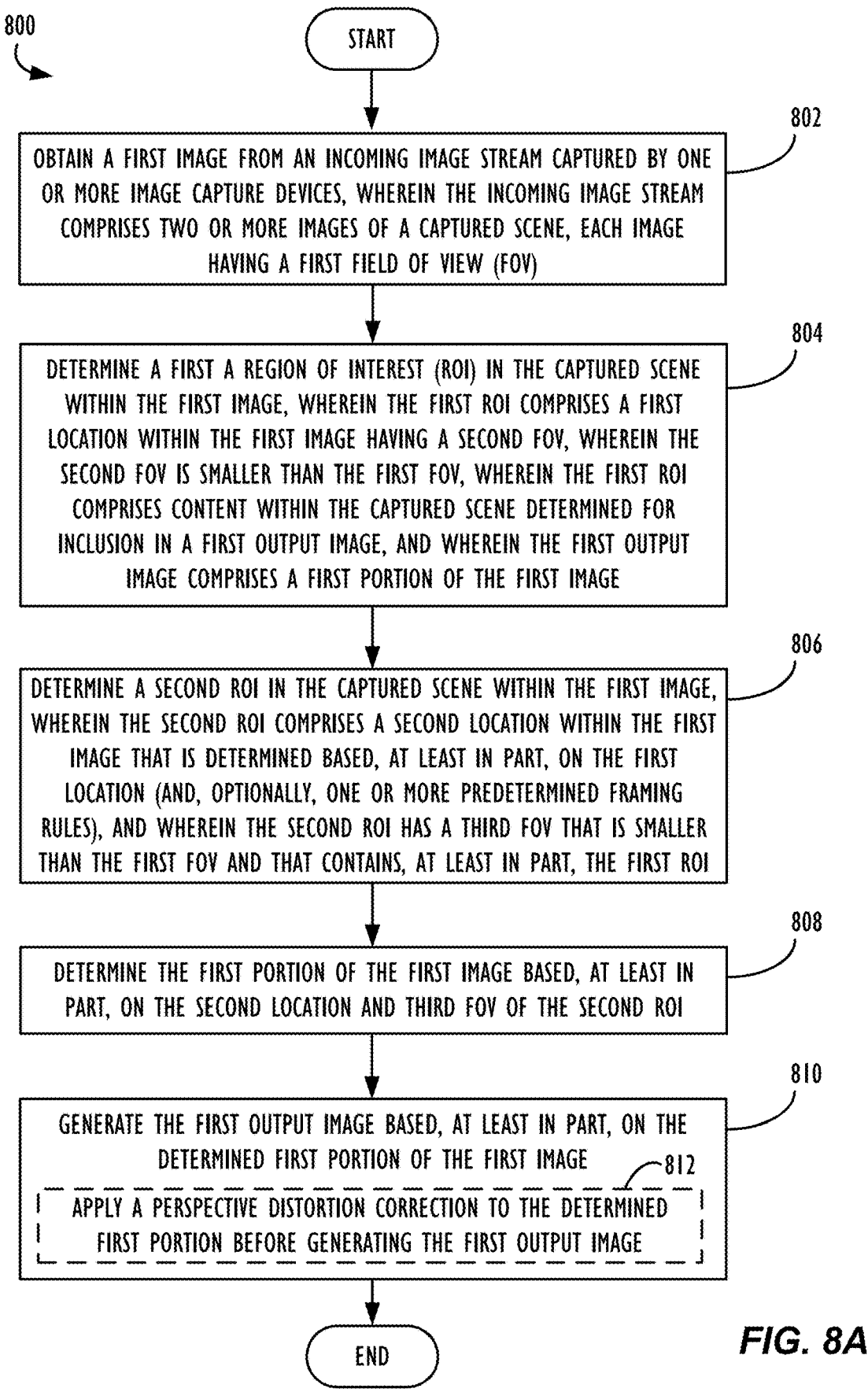
FIG. 8A is a flow chart illustrating a method of generating an image portion from a wide FOV image, according to various embodiments.

Exemplary Methods of Performing "Cinematic" Framing of Wide FOV Video Image Streams FIG. 8A is a flow chart, illustrating a method 800 of generating an image portion from a wide FOV image, according to various embodiments. First, at Step 802, the method 800 may obtain a first image from an incoming image stream captured by one or more image capture devices, wherein the incoming image stream comprises two or more images of a captured scene, each image having a first field of view (FOV). Next, at Step 804, the method 800 may determine a first a region of interest (ROI) in the captured scene within the first image, wherein the first ROI comprises a first location within the first image having a second FOV, wherein the second FOV is smaller than the first FOV, wherein the first ROI comprises content within the captured scene determined for inclusion in a first output image, and wherein the first output image comprises a first portion of the first image.

Next, at Step 806, the method 800 may determine a second ROI in the captured scene within the first image, wherein the second ROI comprises a second location within the first image that is determined based, at least in part, on the first location (and, optionally, one or more predetermined framing rules), and wherein the second ROI has a third FOV that is smaller than the first FOV and that contains, at least in part, the first ROI. According to some embodiments, it is preferable that the second ROI completely contains the first ROI whenever that is possible, given the composition of the scene and the predetermined framing rules in place for a given implementation.

Next, at Step 808, the method 800 may determine the first portion of the first image based, at least in part, on the second location and third FOV of the second ROI. Finally, at Step 810, the method 800 may generate the first output image based, at least in part, on the determined first portion of the first image. If desired, at Step 812, the method 800 may also apply a perspective distortion correction to the determined first portion before generating the first output image. According to some embodiments, various forms of perspective distortion correction (e.g., barrel distortion correction, fisheye lens distortion correction, etc.) may be applied to the determined first portions, with the weights of the various forms of distortion to be applied being based on the FOV of the determined first portion, the content therein, or other factors. In some cases, additional tilt correction may also be applied at Step 812 to account for the direction of a gravity vector with respect to an output image, e.g., by rotating the output image any additional amount necessary, such that the gravity vector is always pointing downward in the output image. Finally, the first portion may be shifted and/or scaled, if necessary, to avoid any "invalid" pixels that may have been pulled in to the first output image by the initial perspective distortion correction operations.

Figure 8B:
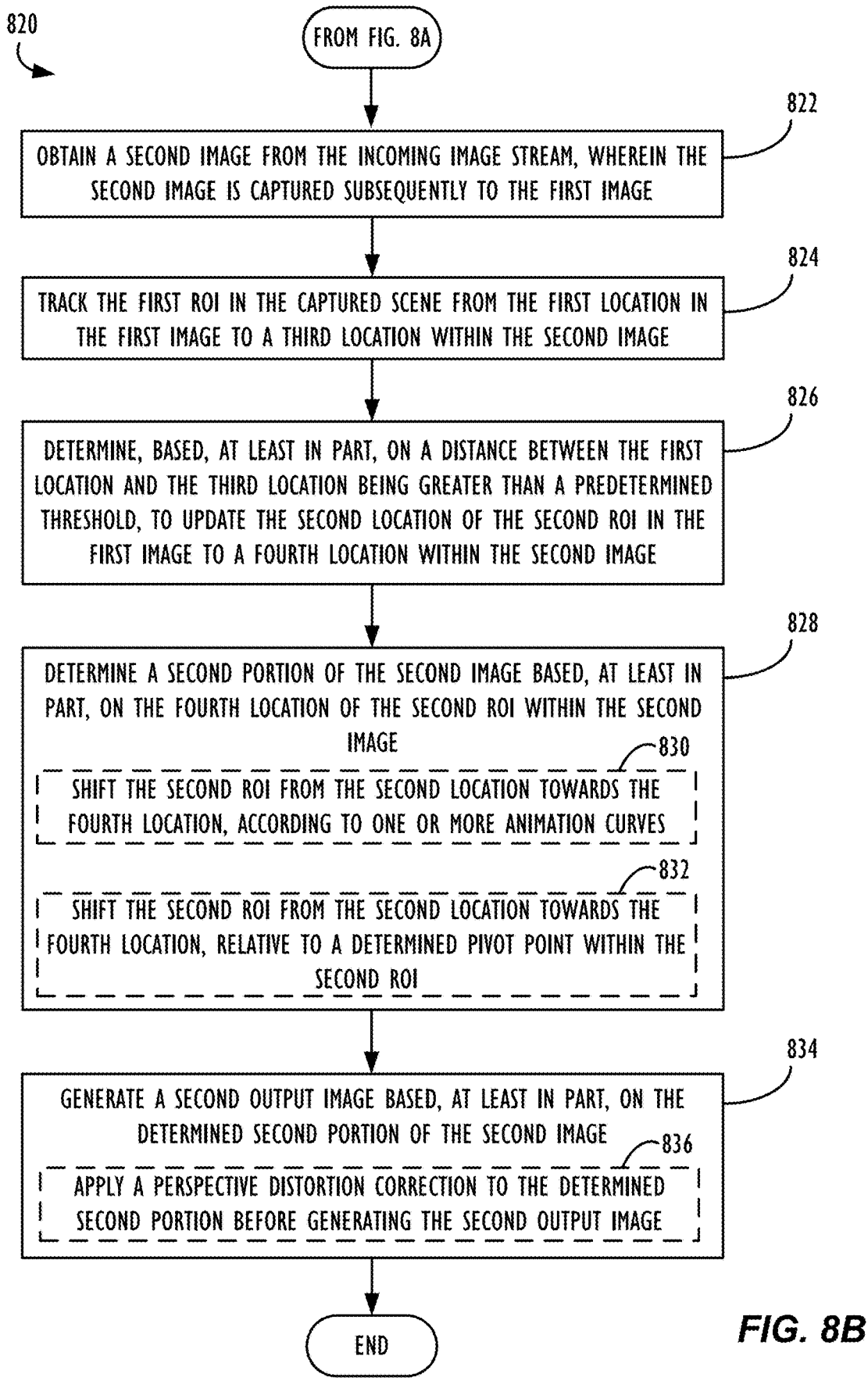
FIG. 8B is a flow chart illustrating a method of generating an image portion from a wide FOV video image stream, according to various embodiments.

FIG. 8B is a flow chart, illustrating a method 820 of generating an image portion from a wide FOV video image stream, according to various embodiments. FIG. 8B provides an example of the type of processing operations that could be applied to a second image (or any subsequent image) of the incoming image stream originally referred to in FIG. 8A. By continuing to track and shift the location/scale the dimensions of ROIs from frame to frame in the images of an incoming image stream, the aesthetic framing and panning decisions for making a "cinematically"-framed output video image stream may be determined.

Returning now to FIG. 8B, first, at Step 822, the method 820 may obtain a second image from the incoming image stream, wherein the second image is captured subsequently to the first image. Next, at Step 824, the method 820 may track the first ROI in the captured scene from the first location in the first image to a third location within the second image. Next, at Step 826, the method 820 may determine, based, at least in part, on a distance between the first location and the third location being greater than a predetermined threshold, to update the second location of the second ROI in the first image to a fourth location within the second image. For example, if the distance between the first location and the third location is less than the predetermined threshold, the method may simply determine not to update the second location of the second ROI, as too much movement of the second ROI (and, by consequence, the first portion) during the course of an output video image stream may prove to be too jarring of an experience for a viewer. Likewise, if the third location has been greater than the threshold distance away from the first location—but only for less than a threshold amount of time—the method may also elect not to update the location of the second ROI, as the movement of the first ROI to the third location may have only been in passing (e.g., a user bending out of frame and then standing right back up), for which it may be too jarring to attempt to update the second location of the second ROI (and, by consequence, the first portion).

Next, at Step 828, the method 820 may determine a second portion of the second image based, at least in part, on the fourth location of the second ROI within the second image. In some cases, determining the second portion may entail shifting the second ROI from the second location towards the fourth location, according to one or more animation curves (Step 830). It is to be understood that, it may take the course of several frames for the second ROI to actual reach its goal of moving the fourth location, moving only a portion of the way with each subsequent frame. Moreover, the fourth location could constantly be updating and changing over the course of the movement of the second ROI. Further still, the second ROI could disappear or leave the scene at any time, at which point it may stop being tracked (and thus stop driving, even in part, the framing decisions of the system). In some cases, shifting the second ROI from the second location towards the fourth location may also be done relative to a determined pivot point within the second ROI, e.g., to avoid aesthetically unpleasing portions from appearing in the output video image stream, as described above with reference to FIG. 7 (Step 832). Finally, at Step 834, the method 820 may generate the second output image based, at least in part, on the determined second portion of the first image. If desired, at Step 836, the method 820 may also apply a perspective distortion correction to the determined second portion before generating the second output image, as described above with reference to Step 812.

Figure 8C:
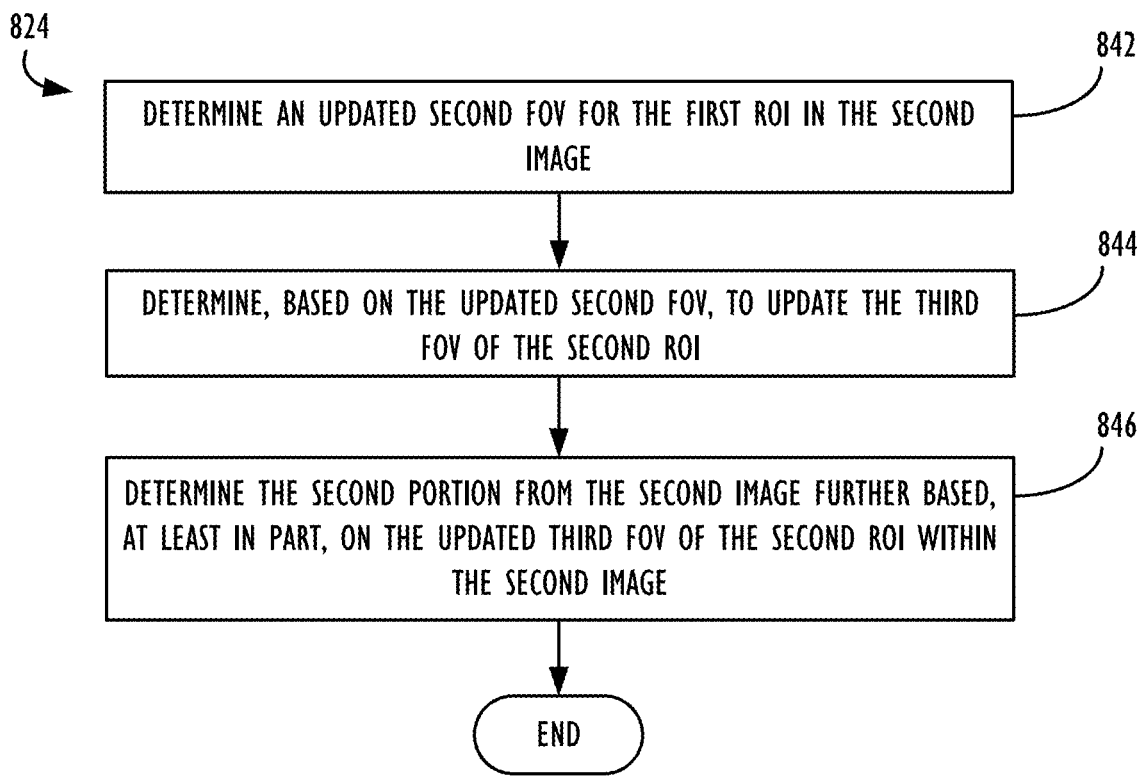
FIG. 8C is a flow chart illustrating a method of rescaling an image portion from a wide FOV video image stream, according to various embodiments.

FIG. 8C is a flow chart illustrating additional details for Step 824 of FIG. 8B, comprising a method of rescaling an image portion from a wide FOV video image stream, according to various embodiments. First, at Step 842, the method may determine an updated second FOV for the first ROI in the second image. Next, at Step 844, the method may determine, based on the updated second FOV, to update the third FOV of the second ROI (e.g., to be either larger or smaller than its current FOV). Finally, at Step 846, the method may determine the second portion from the second image further based, at least in part, on the updated third FOV of the second ROI within the second image (e.g., increasing or decreasing the originally-determined third FOV for the second ROI, based on the size of the first ROI having either increased or decreased over time).

Exemplary Electronic Computing Devices

Figure 9:
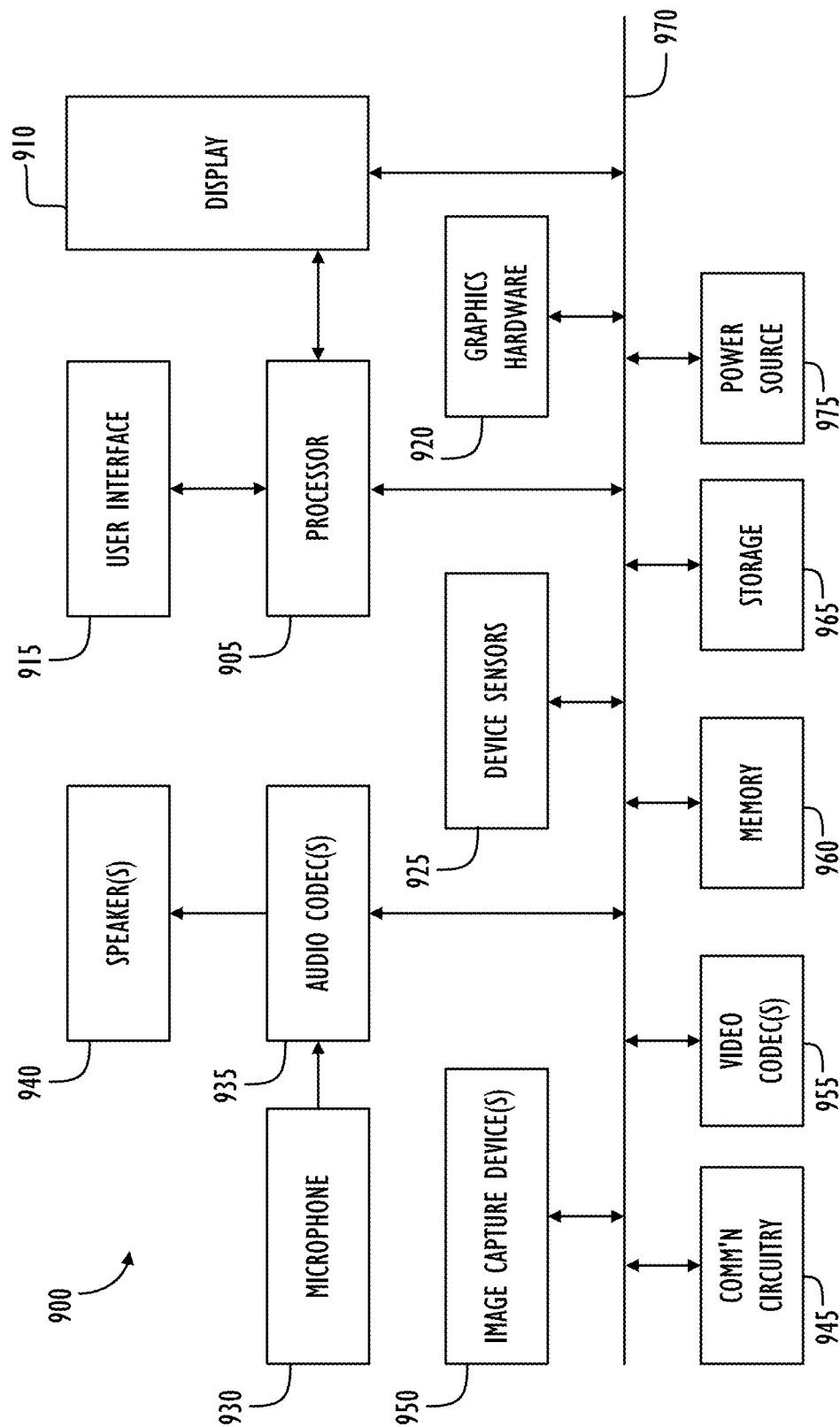
FIG. 9 is a block diagram illustrating a programmable electronic computing device, in which one or more of the techniques disclosed herein may be implemented.

Referring now to FIG. 9, a simplified functional block diagram of illustrative programmable electronic device 900 is shown according to one embodiment. Electronic device 900 could be, for example, a mobile telephone, personal media device, portable camera, or a tablet, notebook or desktop computer system. As shown, electronic device 900 may include processor 905, display 910, user interface 915, graphics hardware 920, device sensors 925 (e.g., proximity sensor/ambient light sensor, accelerometer, inertial measurement unit, and/or gyroscope), microphone 930, audio codec(s) 935, speaker(s) 940, communications circuitry 945, image capture device 950, which may, e.g., comprise multiple camera units/optical image sensors having different characteristics or abilities (e.g., Still Image Stabilization (SIS), HDR, OIS systems, optical zoom, digital zoom, etc.), video codec(s) 955, memory 960, storage 965, and communications bus 970.

Processor 905 may execute instructions necessary to carry out or control the operation of many functions performed by electronic device 900 (e.g., such as the generation and/or processing of images in accordance with the various embodiments described herein). Processor 905 may, for instance, be used to drive display 910 and receive user input from user interface 915. User interface 915 can take a variety of forms, such as a button, keypad, dial, a click wheel, keyboard, display screen and/or a touch screen. User interface 915 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 910 may display a video stream as it is captured while processor 905 and/or graphics hardware 920 and/or image capture circuitry contemporaneously generate and store the video stream in memory 960 and/or storage 965. Processor 905 may be a system-on-chip (SOC) such as those found in mobile devices and include one or more dedicated graphics processing units (GPUs). Processor 905 may be based on reduced instruction-set computer (RISC) or complex instruction-set computer (CISC) architectures or any other suitable architecture and may include one or more processing cores. Graphics hardware 920 may be special purpose computational hardware for processing graphics and/or assisting processor 905 perform computational tasks. In one embodiment, graphics hardware 920 may include one or more programmable graphics processing units (GPUs) and/ or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device 950 may comprise one or more camera units configured to capture images, e.g., images which may be processed to generate framed and/or distortion-corrected versions of said captured images, e.g., in accordance with this disclosure. Output from image capture device 950 may be processed, at least in part, by video codec(s) 955 and/or processor 905 and/or graphics hardware 920, and/or a dedicated image processing unit or image signal processor incorporated within image capture device 950. Images so captured may be stored in memory 960 and/or storage 965. Memory 960 may include one or more different types of media used by processor 905, graphics hardware 920, and image capture device 950 to perform device functions. For example, memory 960 may include memory cache, read-only memory (ROM), and/or random access memory (RAM). Storage 965 may store media (e.g., audio, image and video files), computer program instructions or software, preference information, device profile information, and any other suitable data. Storage 965 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 960 and storage 965 may be used to retain computer program instructions or code organized into one or more modules and written in any desired computer programming language. When executed by, for example, processor 905, such computer program code may implement one or more of the methods or processes described herein. Power source 975 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 900.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
a memory;
one or more image capture devices; and
one or more processors operatively coupled to the memory, wherein the one or more processors are configured to execute instructions causing the one or more processors to:
obtain a first image from an incoming image stream captured by at least one of the one or more image capture devices, wherein the incoming image stream comprises two or more images of a captured scene, each image having a first field of view (FOV);
determine a first a region of interest (ROI) in the captured scene within the first image, wherein the first ROI comprises a first location within the first image having a second FOV, wherein the second FOV is smaller than the first FOV, wherein the first ROI comprises content within the captured scene determined for inclusion in a first output image, and wherein the first output image comprises a first portion of the first image;
determine a second ROI in the captured scene within the first image, wherein the second ROI comprises a second location within the first image that is determined based, at least in part, on the first location, and wherein the second ROI has a third FOV that is smaller than the first FOV and that contains, at least in part, the first ROI;
determine the first portion of the first image based, at least in part, on the second location and third FOV of the second ROI; and
generate the first output image based, at least in part, on the determined first portion of the first image.

2. The device of claim 1, wherein the one or more processors are further configured to execute instructions causing the one or more processors to:
obtain a second image from the incoming image stream, wherein the second image is captured subsequently to the first image;
track the first ROI in the captured scene from the first location in the first image to a third location within the second image;
determine, based, at least in part, on a distance between the first location and the third location being greater than a predetermined threshold, to update the second location of the second ROI in the first image to a fourth location within the second image;
determine a second portion of the second image based, at least in part, on the fourth location of the second ROI within the second image; and
generate a second output image based, at least in part, on the determined second portion of the second image.

3. The device of claim 2, wherein the instructions causing the one or more processors to track the first ROI in the captured scene from the first location in the first image to a third location within the second image further comprise instructions causing the one or more processors to:
determine an updated second FOV for the first ROI in the second image;
determine, based on the updated second FOV, to update the third FOV of the second ROI; and determine the second portion of the second image further based, at least in part, on the updated third FOV of the second ROI within the second image.

4. The device of claim 2, wherein the instructions causing the one or more processors to determine a second portion of the second image further comprise instructions causing the one or more processors to:
shift the second ROI from the second location towards the fourth location, according to one or more animation curves.

5. The device of claim 4, wherein the one or more animation curves comprise: a horizontal displacement curve; a vertical displacement curve; and a zoom curve.

6. The device of claim 4, wherein at least one of the one or more animation curves is parameterized by at least one of: an acceleration value; a time value; or an animation constraint value.

7. The device of claim 4, wherein the instructions causing the one or more processors to shift the second ROI from the second location towards the fourth location according to one or more animation curves further comprise instructions causing the one or more processors to:
shift the second ROI a portion of the way from the second location towards the fourth location, according to the one or more animation curves.

8. The device of claim 4, wherein the instructions causing the one or more processors to shift the second ROI from the second location towards the fourth location according to one or more animation curves further comprise instructions causing the one or more processors to:
shift the second ROI all the way from the second location to the fourth location, according to the one or more animation curves.

9. The device of claim 4, wherein the instructions causing the one or more processors to shift the second ROI from the second location towards the fourth location further comprise instructions causing the one or more processors to:
shift the second ROI from the second location towards the fourth location, relative to a determined pivot point within the second ROI.

10. The device of claim 1, wherein the instructions causing the one or more processors to generate the first output image further comprise instructions causing the one or more processors to:
apply a perspective distortion correction to the determined first portion of the first image based, at least in part, on the second location of the second ROI within the first image and the third FOV of the second ROI.

11. The device of claim 1, wherein the first ROI further comprises a third location within the first image having a fourth FOV, wherein the fourth FOV is smaller than the first FOV, and wherein the fourth FOV comprises further content within the captured scene determined for inclusion in the first output image.

12. The device of claim 11, wherein the instructions causing the one or more processors to determine the second ROI further comprise instructions causing the one or more processors to:
determine the second location of the second ROI further based, at least in part, on the third location, wherein the second ROI further contains, at least in part, the fourth FOV.

13. The device of claim 1, wherein the third FOV contains all of the first ROI.

14. The device of claim 1, wherein the instructions causing the one or more processors to determine a second ROI in the captured scene comprising a second location within the first image further comprise instructions causing the one or more processors to:
determine the second location of the second ROI based, at least in part, on framing at least a portion of the first ROI within the second ROI, according to one or more predetermined framing rules.

15. The device of claim 1, wherein the instructions causing the one or more processors to determine the first portion of the first image based, at least in part, on the second location and third FOV of the second ROI further comprise instructions causing the one or more processors to:
determine a third location of the first portion based, at least in part, on framing the second ROI within the first portion, according to one or more predetermined framing rules.

16. The device of claim 1, wherein first ROI includes a human subject, and wherein a size of the second FOV of the first ROI is determined based, at least in part, on an estimated depth in the captured scene of the human subject.

17. The device of claim 1, wherein the one or more processors are further configured to execute instructions causing the one or more processors to:
display the first output image on a display of the device.

18. The device of claim 1, wherein the one or more processors are further configured to execute instructions causing the one or more processors to:
transmit the first output image to a second device.

19. A non-transitory program storage device (NPSD) comprising instructions executable by one or more processors to:
obtain a first image from an incoming image stream captured by at least one image capture device, wherein the incoming image stream comprises two or more images of a captured scene, each image having a first field of view (FOV);
determine a first a region of interest (ROI) in the captured scene within the first image, wherein the first ROI comprises a first location within the first image having a second FOV, wherein the second FOV is smaller than the first FOV, wherein the first ROI comprises content within the captured scene determined for inclusion in a first output image, and wherein the first output image comprises a first portion of the first image;
determine a second ROI in the captured scene within the first image, wherein the second ROI comprises a second location within the first image that is determined based, at least in part, on the first location, and wherein the second ROI has a third FOV that is smaller than the first FOV and that contains, at least in part, the first ROI;
determine the first portion of the first image based, at least in part, on the second location and third FOV of the second ROI; and
generate the first output image based, at least in part, on the determined first portion of the first image.

20. An image processing method, comprising:
obtaining a first image from an incoming image stream captured by at least one image capture device, wherein the incoming image stream comprises two or more images of a captured scene, each image having a first field of view (FOV);
determining a first a region of interest (ROI) in the captured scene within the first image, wherein the first ROI comprises a first location within the first image having a second FOV, wherein the second FOV is smaller than the first FOV, wherein the first ROI comprises content within the captured scene determined for inclusion in a first output image, and wherein the first output image comprises a first portion of the first image;

determining a second ROI in the captured scene within the first image, wherein the second ROI comprises a second location within the first image that is determined based, at least in part, on the first location, and wherein the second ROI has a third FOV that is smaller than the first FOV and that contains, at least in part, the first ROI;

determining the first portion of the first image based, at least in part, on the second location and third FOV of the second ROI; and generating the first output image based, at least in part, on the determined first portion of the first image.

* * * * *